United States Patent
Popescu

(10) Patent No.: US 9,917,436 B2
(45) Date of Patent: Mar. 13, 2018

(54) SYSTEM AND METHOD FOR CONTROL OF POWER DISTRIBUTION

(75) Inventor: Bogdan Cristian Popescu, Calgary (CA)

(73) Assignee: General Electric Company, Schenectady, NY (US)

(*) Notice: Subject to any disclaimer, the term of this patent is extended or adjusted under 35 U.S.C. 154(b) by 1173 days.

(21) Appl. No.: 11/978,740

(22) Filed: Oct. 30, 2007

(65) Prior Publication Data
US 2009/0112375 A1    Apr. 30, 2009

(51) Int. Cl.
G06F 19/00 (2011.01)
H02H 7/26 (2006.01)
G06Q 10/06 (2012.01)
G06Q 50/06 (2012.01)
H02H 1/00 (2006.01)

(52) U.S. Cl.
CPC .......... H02H 7/261 (2013.01); G06Q 10/06 (2013.01); G06Q 50/06 (2013.01); H02H 1/0092 (2013.01)

(58) Field of Classification Search
CPC .................................................. H02H 7/261
USPC ........... 700/292; 307/23, 64–65, 113, 141.8, 307/153, 154, 156; 361/62, 64, 72
See application file for complete search history.

(56) References Cited

U.S. PATENT DOCUMENTS

| 3,909,677 A | 9/1975 | McClain |
| 4,302,750 A | 11/1981 | Wadhwani et al. |
| 4,322,842 A | 3/1982 | Martinez |
| 5,237,511 A | 8/1993 | Caird et al. |
| 5,272,462 A * | 12/1993 | Teyssandier ........ H02J 13/0089 340/12.32 |
| 5,381,413 A * | 1/1995 | Tobagi ................ H04L 47/10 370/232 |

(Continued)

FOREIGN PATENT DOCUMENTS

| EP | 0940901 A2 | 9/1999 | |
| JP | 2241333 * | 9/1990 | ............... H02J 7/26 |

(Continued)

OTHER PUBLICATIONS

C.L. Hor et al, Substation event analysis using information form intelligent electronic devices, pp. 374-386.*

(Continued)

Primary Examiner — Miranda Huang
Assistant Examiner — Olvin Lopez Alvarez
(74) Attorney, Agent, or Firm — Eversheds Sutherland (US) LLP

(57) ABSTRACT

A system for controlling a multi-feed power distribution network is described herein. The network includes a first network sector that includes a first plurality of devices connected to a first power source and a second network sector that includes a second plurality of devices connected to a second power source. The system includes a first controller and a second controller. The first controller is configured to control operation of the first network sector and exchange data with the second controller. The second controller is configured to control operation of the second network sector and exchange data with the first controller. The system is modular and it can be expanded to include additional controllers as necessary. Methods and a computer program product for controlling a multi-feed power distribution network are also described.

20 Claims, 6 Drawing Sheets

(56) References Cited

U.S. PATENT DOCUMENTS

| | | | |
|---|---|---|---|
| 5,438,509 A | | 8/1995 | Heffron |
| 5,701,226 A | * | 12/1997 | Gelbien et al. ............... 361/63 |
| 5,732,193 A | | 3/1998 | Aberson |
| 5,734,255 A | | 3/1998 | Thompson et al. |
| 5,734,586 A | | 3/1998 | Chiang et al. |
| 5,784,237 A | * | 7/1998 | Velez ............................ 361/62 |
| 5,812,389 A | | 9/1998 | Katayama et al. |
| 5,896,302 A | * | 4/1999 | Goodpaster ................ 700/292 |
| 5,973,899 A | * | 10/1999 | Williams et al. ............. 361/72 |
| 6,005,759 A | | 12/1999 | Hart et al. |
| 6,018,449 A | | 1/2000 | Nelson et al. |
| 6,112,246 A | | 8/2000 | Horbal et al. |
| 6,243,244 B1 | | 6/2001 | Nelson et al. |
| 6,259,972 B1 | * | 7/2001 | Sumic et al. ................ 700/286 |
| 6,275,366 B1 | * | 8/2001 | Gelbien ................. H02H 7/262 361/115 |
| 6,347,027 B1 | * | 2/2002 | Nelson et al. ................ 361/64 |
| 6,504,693 B1 | * | 1/2003 | Moffat et al. ................. 361/62 |
| 6,529,857 B1 | | 3/2003 | O Donnell et al. |
| 6,535,797 B1 | * | 3/2003 | Bowles et al. .............. 700/286 |
| 6,539,287 B1 | * | 3/2003 | Ashizawa .................... 700/292 |
| 6,564,242 B1 | | 5/2003 | Bonet et al. |
| 6,907,321 B2 | * | 6/2005 | Kearney .............. H02H 7/266 700/292 |
| 7,359,957 B2 | | 4/2008 | Dinges et al. |
| 7,554,459 B2 | | 6/2009 | Giubbini |
| 7,751,166 B2 | * | 7/2010 | Stoupis et al. ................ 361/64 |
| 7,852,207 B2 | | 12/2010 | Berkman et al. |
| 7,936,685 B2 | | 5/2011 | Kucharczyk |
| 7,937,167 B1 | | 5/2011 | Mesarina et al. |
| 8,000,913 B2 | | 8/2011 | Kreiss et al. |
| 2003/0185150 A1 | * | 10/2003 | Matsumoto et al. ......... 370/217 |
| 2004/0158417 A1 | * | 8/2004 | Bonet .............................. 702/57 |
| 2005/0165730 A1 | | 7/2005 | Akiyama |
| 2005/0251296 A1 | * | 11/2005 | Tracy Nelson et al. ...... 700/292 |
| 2006/0195229 A1 | * | 8/2006 | Bell et al. .................... 700/286 |
| 2007/0005193 A1 | | 1/2007 | Nelson et al. |
| 2007/0192332 A1 | | 8/2007 | Deuter et al. |
| 2007/0285857 A1 | * | 12/2007 | Berkowitz ............ H02H 7/30 361/64 |
| 2008/0100975 A1 | | 5/2008 | Myoung et al. |
| 2008/0103631 A1 | * | 5/2008 | Koliwad et al. ............. 700/286 |
| 2008/0211511 A1 | | 9/2008 | Choi et al. |
| 2008/0215797 A1 | | 9/2008 | Dinges et al. |
| 2008/0231114 A1 | * | 9/2008 | Tolnar et al. ................... 307/38 |
| 2008/0255709 A1 | | 10/2008 | Balgard et al. |
| 2009/0034419 A1 | | 2/2009 | Flammer, III et al. |
| 2009/0112375 A1 | | 4/2009 | Popescu |
| 2009/0138104 A1 | | 5/2009 | Huck |
| 2011/0035067 A1 | * | 2/2011 | Larsson et al. ............... 700/286 |
| 2011/0313586 A1 | * | 12/2011 | Popescu et al. .............. 700/295 |
| 2013/0054042 A1 | * | 2/2013 | du Toit et al. ................ 700/292 |
| 2013/0066444 A1 | * | 3/2013 | Popescu et al. ................ 700/19 |

FOREIGN PATENT DOCUMENTS

| | | |
|---|---|---|
| JP | 5219664 A | 8/1993 |
| JP | 6189454 A | 7/1994 |
| JP | 8228432 A | 9/1996 |
| JP | 1997-046894 A | 2/1997 |
| JP | 2006-174686 A | 6/2006 |
| JP | 2007-116893 A | 5/2007 |
| WO | 9509473 A1 | 4/1995 |
| WO | 9726587 A1 | 7/1997 |
| WO | 9842103 A1 | 9/1998 |

OTHER PUBLICATIONS

Fan et al, "Feeder Automation within the Scope of Substation Automation", 2006, IEEE, pp. 607-612.*
Staszesky et al, "Advanced feeder Automation is here", IEEE, 2005, pp. 56-63.*
Watson, "Benefits of Distribution Automation and Performance Results From a Network Trial", IEEE, 1997, pp. 251-255.*
S&C Electric Company, "IntelliTeam Exceeds Reliability Goals", Apr. 2005, pp. 2.*
S&C Electric Company, "S&C IntelliTeam II Automatic Restoration System", Jun. 2005, pp. 4.*
Mitsuo et al, "JP 05-219664 Monitor-Control Sytem for Power Distribution System as supported by a Machine translation", pp. 7.*
Webopedia.com, "Definition of: Polling", downloaded Jul. 3, 2013, pp. 1.*
Office Action from corresponding JP Application No. 2008-275128, dated Mar. 5, 2013.
English translation of Chinese Office Action for CN Application No. 200810173121.0, dated Jun. 1, 2012, pp. 1-10.
English Translation of Chinese Office Action for CN Application No. 200810173121.0, dated Dec. 6, 2012, pp. 1-6.
Office action issued in connection with CN Patent Application No. 200810173121.0, dated Jun. 5, 2013.
EP Search Report Issued in Application No. 08167306.3, dated Dec. 5, 2017 (10 pages).

* cited by examiner

SYSTEM AND METHOD FOR CONTROL OF POWER DISTRIBUTION

BACKGROUND OF THE INVENTION

The subject matter disclosed herein relates to systems and applications for controlling power distribution networks with multiple feeds from one or more substations.

Electrical power distribution networks (i.e., grids) generally consist of multiple segments tied together via switches and other field devices, and are generally fed from one or more sources. When these networks use active devices which can sense conditions in power circuits formed in the networks and can distinguish between the various segments (e.g. controlled switches, reclosers, etc.), then it is possible in the case of power faults inside a given segment of the network, on all or on individual phases, to isolate the faulted segment and thereafter restore power to the remaining segment(s).

Typical systems in place to achieve this functionality are limited to simple power network topologies, typically using a maximum of two feeds, and/or a single substation, and furthermore have limitations in the number of interconnections, splits and segments identifiable and segregatable in the grid.

Many control systems for more complex grids, such as mesh-like grids, require centralized distribution management systems (DMS) or central controllers that control operation of all substations. Alternatively, control systems may utilize distributed logic controllers for complex grids. However, such distributed logic control systems generally require the use of the same type of control devices, often from the same supplier, across the entire distribution power grid. Furthermore, adding control devices and/or field devices in the network may require the reconfiguration of existing control devices.

Furthermore, such systems are not capable of less than three phase restoration unless a single central controller is utilized for the entire power distribution grid.

Typical approaches thus are either centralized, or in the case of distributed implementations, are limited in the types and extents of power grid layouts that can be accounted for, due to topology constraints. These approaches thus have restricted applicability, and generally require highly skilled engineers for configuration of control devices for non-typical grid layouts.

Accordingly, there remains a need in the art for network control systems and methods that are modular, distributed, expandable and simple to configure while still being capable of working with any grid layout in single or multiple phases without the need of code changes.

BRIEF DESCRIPTION OF THE INVENTION

In accordance with one aspect, the present invention provides a system for controlling a multi-feed power distribution network. The network includes a first network sector that includes a first plurality of devices connected to a first power source and a second network sector that includes a second plurality of devices connected to a second power source. The system includes a first controller and a second controller. The first controller is configured to control operation of the first network sector and exchange data with the second controller, and the second controller is configured to control operation of the second network sector and exchange data with the first controller.

In accordance with another aspect, the present invention provides a method for controlling a multi-feed power distribution network that includes a plurality of controllers. The method includes i) receiving a fault indication in a first controller, the first controller being configured to control a first plurality of switches in a first sector of the network connected to a first power source, the fault indication representing a fault in a faulted segment of the first sector; ii) isolating the fault in the first sector by opening one or more of the first plurality of switches in the first sector that surround the faulted segment; and iii) communicating with a second controller to request restoration of power to one or more isolated segments in the first sector.

In accordance with another aspect, the present invention provides a method for controlling a multi-feed power distribution network. The network includes at least a first substation controller configured to control a first network sector that includes a first plurality of devices in the power distribution network. The method includes i) generating a first set of data representing properties of each of the first plurality of devices; ii) generating a first multi-dimensional data array for the first network sector, the first data array including a first plurality of array elements, each of the first plurality of array elements representing properties of one of the first plurality of devices; and iii) controlling operation of the first plurality of devices using the first data array.

In accordance with another aspect, the present invention provides a computer program product for controlling a multi-feed power distribution network having at least one network sector that includes a plurality of devices connected to a power source. The program includes a storage medium, readable by a processor, storing instructions for execution by the processor. The instructions implement a method including i) generating data representing properties of each of the plurality of devices; ii) generating a multi-dimensional data array for the at least one network sector, the data array including a plurality of array elements, each of the plurality of array elements representing properties of one of the plurality of devices; and iii) controlling operation of the plurality of devices using the multi-dimensional data array.

It should be appreciated that the present invention provides distributed and modular systems and methods for controlling electrical power distribution networks that provide for peer-to-peer communication between controllers in one or more network substations for restoring power in faulted segments, in single or multiple phases, from multiple power sources. The systems and methods allow for expandability of the network without the need to reconfigure devices deployed across the network. In any event, additional objects, features and advantages of the various aspects of the present invention will become more readily apparent from the following detailed description when taken in conjunction with the drawings wherein like reference numerals refer to corresponding parts in the several views.

The above described and other features are exemplified by the following detailed description and appended claims.

BRIEF DESCRIPTION OF THE DRAWINGS

The following description of the figures is not intended to be, and should not be interpreted to be, limiting in any way.

DETAILED DESCRIPTION OF THE INVENTION

Various embodiments of systems and methods for describing and controlling power distribution networks are described herein. The systems and methods perform various functions, including identification of one or more faulted segments inside a power distribution network and restoration of power to as many non-faulted segments as possible, using distributed logic controllers capable of data exchange therebetween, and multiple feed power network topologies. The systems and methods described herein also may perform single-phase, dual-phase or three-phase isolation and restoration as required.

Also provided herein is an automated, distributed, and modular control application, and a method for restoring power to segments of a distribution network after a fault event. Various embodiments of the control application, such as computer programs, are described which may be provided as modules in existing network control applications. Embodiments of the control application may also reside in modules located within distribution network control and management systems and servers. When equipped with the control application, and any suitable communication protocols and interfaces for interaction with field devices, the control application may provide full distribution automation (DA) without the need for dedicated master controllers, and allow expansion of the distribution network control without the need for extensive and potentially labor intensive changes to controller configurations or software.

The system and control application, after detecting a fault, acts to isolate a faulted segment and determine a preferred routing path or paths to restore power to non-faulted segments. In addition, the system and method allows for power to be restored to non-faulted segments from one or more alternative sources, such as additional sources within an associated substation or from sources associated with alternate substations, via peer-to-peer communication between multiple controllers and/or substations. The control application can monitor a distribution network and be capable of issuing automatic re-configuration orders to controllable switches within the network, so that the network topology (i.e., all connectivity paths across all sectors within a layout at any given moment) is changed and faults are isolated while maintaining maximum power service to as many segments as possible.

Figure 1:
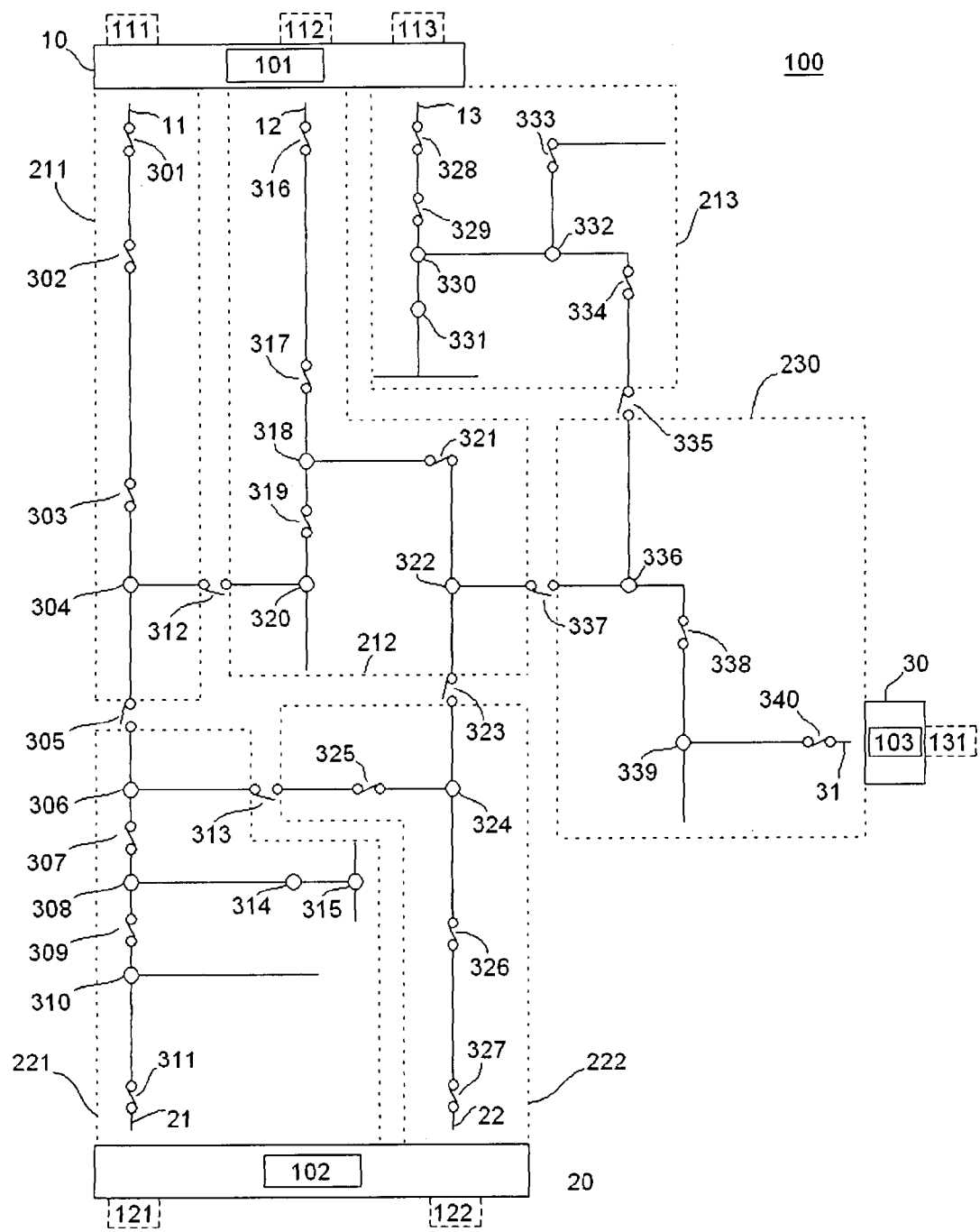
FIG. 1 is an illustration of an electrical power distribution network.

With initial reference to FIG. 1, an exemplary power distribution network is generally indicated at 100. The power distribution network 100 includes a plurality of substations 10, 20 and 30, each of which is associated with one or more feeders, shown as 11, 12, 13, 21, 22 and 31. Each substation 10, 20 and 30 also includes one or more circuit breakers, i.e. substation circuit breakers (or simply "breakers"), 301, 311, 316, 327, 328 and 340, each of which is connected to one of feeders 11, 12, 13, 21, 22 and 31.

Substation breakers may also be described as "roots". As used herein, the term "feeder" refers to a transmission line or other conductor that provides power to one or more portions of the network 100. In the present exemplary embodiment shown in FIG. 1, substation 10 is associated with feeders 11, 12 and 13, each of which are connected to breakers 301, 316 and 328 respectively. Substation 20 is associated with feeders 21 and 22, each of which are connected to breakers 311 and 327 respectively. Substation 30 is associated with feeder 31, which is connected to breaker 340. Although only three substations are depicted in this example, the network 100 may include any number of substations, each of which may include any number of feeders.

Network 100 includes a plurality of nodes 301-340, each of which affect the topology of network 100 and connect portions of one or more feeders. The term "node" relates to any addressable point on network 100. Nodes 301-340 may include any type of field device such as a circuit split, a sensor or other measurement point, and a controllable switch such as a circuit breaker or recloser. The controllable switches may be either normally closed or normally open. Nodes 301-340 may be characterized as active or passive. "Active nodes" relate to any nodes that can be controlled to affect a topology change. Active nodes include reclosers, circuit breakers and controllable switches (including as remote-controllable switches). Active nodes may be capable of three-phase or individual phase control. "Passive nodes" relate to nodes including network splits or any non-controllable items, and do not cause a topology change. Passive nodes may be accounted for because of consideration of load capacities due to re-routing possibilities within the network sector. Nodes may also define various branches, in which the circuit formed in the network splits into multiple additional circuits. A branch may occur as a single or multiple phase branch. The node where the split occurs, located toward the associated substation breaker, may be described as a "branch root".

Network 100 defines an associated "layout", which refers to the distribution of the connections of the network, including static and geographical distributions. Network 100 may also be divided into one or more "segments" or "trunks", which refer to portions of the feeder located between significant active or passive network nodes. Depending on the layout, segments may be capable of accepting power from multiple feeders across multiple substations. Each segment may have an associated configured "load capacity", which represents the maximum load that can be handled by the segment.

Referring again to FIG. 1, in the present exemplary embodiment, nodes 301-340 include passive network nodes, normally closed switches, normally open switches, and sensors. There is no pre-configured limit to the number of nodes. Nodes 302, 303, 307, 309, 317, 319, 321, 325, 326, 329, 333, 334 and 338 are normally closed switches, which may be opened to isolate a faulted segment. Nodes 305, 312, 313, 323, 335 and 337 are normally opened switches, which act to prevent cross power transmission and define the sectors of network 100. Nodes 304, 306, 308, 310, 315, 318, 320, 322, 324, 330, 332, 336 and 339 are passive network nodes, and nodes 314 and 331 are sensors. The layout of network 100, and the particular configuration of types and numbers of nodes shown in the present embodiment are merely exemplary. The system and methods described herein are applicable to any power distribution network having any desired topology, and any number, type and configuration of nodes.

Network 100 also includes a plurality of sectors, each of which may be fed by an individual feeder. The term "sector" relates to a distribution sub-network associated with a finite number of active nodes, such as breakers, switches and reclosers. Sectors may also be referred to as "power areas". Each sector may be associated with an individual feeder or with multiple feeders. In one embodiment, each sector includes all of the segments between a single breaker in a substation connected to a single feeder and all normally open switches. The "edge" of a sector refers to the breakers in a substation and the normally open switches. In the present example shown in FIG. 1, network 100 includes six sectors 211, 212, 213, 221, 222 and 230, each associated with an individual feeder and bounded by a substation breaker and at least one normally open switch. Nodes, such as normally open switches, that define the edge of a sector and connect adjacent sectors may be referred to as "edge nodes".

In the present example, shown in FIG. 1, all segments are three-phase, i.e., there are no single-phase circuits. However, the control application and method described herein is capable of single-phase processing, and thus can be applied to non-three-phase networks such as single-phase networks.

The position of various nodes, substations, or other components in network 100 are described in relation to one another, and may be described in relation to their position on a network path in relation to other nodes, breakers, feeders or substations. For example, a first node described as being "before" or "previous" to a second node, "preceding" the second node or "upstream" from the second node, indicates that the first node is located before the second node when parsing the circuit path from the breaker toward an edge of the sector, i.e., is located between the breaker or substation and the second node. Likewise, a first node described as being "the next node", "after" or "following" a second node, or "downstream" from the second node, indicates that the first node follows the second node when parsing the circuit path from the breaker toward an edge of the sector, i.e., is located between the second node and a sector edge node.

Each substation 10, 20 and 30 includes a respective controller 101, 102 and 103 to control various network nodes. As shown in FIG. 1, controller 101 is included in substation 10, controller 102 is included in substation 20, and controller 103 is included in substation 30. In one embodiment, each controller 101, 102 and 103 is a Distribution Automation (DA) controller. In the present embodiment, each substation includes one controller. However, a substation may include more than one controller if desired. Each controller 101, 102 and 103 may also serve as a Supervisor Control and Data Acquisition (SCADA) remote terminal unit (RTU) as needed. Each controller 101, 102 and 103 communicates in a client-server (master-slave) relationship with the active nodes and sensors located on power segments energized from a respective substation. Each controller 101, 102 and 103 is also configured to communicate and exchange data with other controllers. In one embodiment, communication between controllers and nodes is accomplished by way of a wireless network including, for example, fixed IP wireless devices associated with each controller and field device (i.e., node).

Each controller 101, 102 and 103 controls at least one sector defined by a respective breaker and one or more respective open switches. In the example shown in FIG. 1, network 100 is divided into sectors 211, 212, 213, 221, 222 and 230. Sector 211 has edges defined by breaker 301 and normally open switches 305 and 312, sector 212 has edges defined by breaker 316 and normally open switches 312, 323 and 337, and sector 213 has edges defined by breaker 328 and normally open switch 335. Sectors 211, 212 and 213 are controlled by controller 101. Sector 221 has edges defined by breaker 311 and normally open switches 305 and 313, and sector 222 has edges defined by breaker 327 and normally open switches 313 and 323. Sectors 221 and 222 are controlled by controller 102. Sector 230 has edges defined by breaker 340 and normally open switches 335 and 337, and is controlled by controller 103. In one embodiment, all nodes in each sector transmit data to, and receive commands from, only the sector's respective controller.

In one embodiment, if a given substation does not include a controller, controllers in other substations may be configured to interface the sectors normally covered by the given substation, thus building "logical" controllers. This configuration may result in a fully separate instance of the control application. Multiple sectors associated with the same substation may be controlled by the same physical controller, although from the perspective of the control application the physical controller may appear as different logical controllers.

Normally open switches may send data to and accept commands from controllers on either side of the normally open switch (in the case of multiple feeders in the same substation, these may include "logical" controllers). If this is not possible due to communication protocol limitations in the normally open switch, then one designated controller may be exclusively in charge of that active node, by marking this in the control application configuration.

The controllers and associated control applications and methods are described further herein. As an example, the features of the controller will be described in conjunction with controller 101. However, the features are also applicable to controllers 102 and 103, as well as any other controllers applied to any other substations and/or networks.

Controller 101 receives data from, and transmits data and/or commands to, nodes in sectors 211, 212 and 213. In addition, controller 101 is configured to exchange data with other controllers, e.g., controllers 102 and 103. If a fault occurs in sector 211, for example, controller 101 may communicate with the other controllers 102 and 103 to determine whether controller 102 and/or 103 has the capability to supply power to isolated segments of sector 211, and transmits appropriate requests to controllers 102 and/or 103 as needed, to close switches and restore power to the isolated segments.

A control application is provided, that may reside in one or more controllers and be executed by one or more controllers to initiate a process for controlling the topology of network 100 by identifying faults in the network, isolating the faults, and restoring power to isolated segments from one or more controllers.

In one embodiment, each sector is recognized by the control application as a controller instance. Furthermore, in those substations having multiple feeders, and thus multiple sectors, the control application may represent the controller in that substation as multiple "logical" controller instances. Data is then exchanged between controller instances as needed. As used herein, "controller instance" includes a physical or logical controller recognized by the control application. Multiple controllers (or controller instances) may communicate among each other in a peer-to-peer manner and exchange data about the status of their own network sector via the control application.

In the example shown in FIG. 1, the control application represents controllers 101, 102 and 103 as controller instances. Controller 101 may be represented as controller instances 111, 112 and 113, which control sectors 211, 212 and 213, respectively. Controller 102 may be represented as controller instances 121 and 122, which control sectors 221 and 222, respectively. Controller 103 may be represented as controller instance 131, which controls sector 31.

In the case of a fault in a given segment, the controller instance that controls the faulted sector, i.e., the sector that includes the faulted segment, may be referred to as the "trigger controller". The trigger controller will isolate the fault, then look for possibilities of restoring the power from the same substation, or from other substations, by inquiring as to the power availability and circuit capacity restrictions of the remaining controller instances, described as "peer controllers". Such requests or inquiries may be performed according to a pre-configured priority list. This priority list may be remotely changed at runtime if required. Peer controllers become an active part of the control application process after receiving requests from the trigger controller, and may be logical devices.

There is no single master controller in the systems and methods described herein. Each controller instance may take charge when a power fault occurs in a sector controlled by that controller, for the duration required to restore power to isolated segments. The trigger controller may retain the "master" attribute in terms of reporting to upper levels, by waiting for replies from the peer controller(s), and indicating to control centers and/or users either the timeout, success or failure of the process, depending on the replies from the peer controllers. In the case of simultaneous faults, there may be multiple controllers acting a "trigger controllers", i.e. attempting to restore power.

The control application may reside in one or more controllers, and is executed to perform one or more of the methods described herein.

In one embodiment, the control application performs a method for describing the network layout by generating data describing the network. Pursuant to this method, the control application describes the configuration of the network as simple individual segments and nodes. This configuration data may be converted by the control application (or a configuration tool therein) into dynamically sized, multi-dimensional arrays that store the configuration information.

In one embodiment, the control application describes the network layout by storing array elements corresponding to each node in the network. This may be performed sequentially for each sector in the network. Each node is thus described in the array as configured array data, and various characteristics or properties of each node are described in the associated array element.

The control application may also record real time data from field devices (e.g. active nodes) and build sets of arrays as placeholders. This data may be referred to as "run time array data". By parsing the run time array data in reference to the configured array data, the control application can determine appropriate routing methods for power to the grid's segments (single or multiple phase). When grid limits are reached, i.e., the control application has described the configuration and run time data for all nodes associated with the respective sector, the control application will inform adjacent applications running in other controllers, so that the entire network grid is described in the array in an expandable form.

One embodiment of the method of describing the network is further described in the context of exemplary Table 1, which is created by this method to describe the layout of network 100 shown in FIG. 1. Table 1 and the following description illustrate examples of naming conventions for each node and examples of representing the properties and configuration of each node that may be entered. The conventions used to name various nodes and indicate various properties and configuration, and the data values described, are merely exemplary. Any suitable conventions may be used to collect the data. Furthermore, the types of data collected for each node is also exemplary and is not meant to be limiting.

The method of describing includes describing each network sector associated with a respective feeder, and individually describing each node in an order beginning at the breaker and ending at the edge nodes of the sector, until all normally open switches are reached for that feeder. The configuration of each node may be described and compiled as shown in Table 1. Exemplary names and data values are described as follows.

TABLE 1

| DAC # (S) | Feeder # (F) | Node # (N) | Node type (T) | Contains 3-phase protection? (3P) | Maximum load capacity for the segment after (L) | Can it measure voltage? (V) | Can it measure load? (M) | Can it provide fault indication without a trip? (A) | Customer priority (Y) | Next node # or DAC #/Priority # (E) |
|---|---|---|---|---|---|---|---|---|---|---|
| 1 | 1 | n0 | B3 | N | | | | | | n1 |
| 1 | 1 | n1 | R31 | Y | | | | | | n2 |
| 1 | 1 | n2 | R3 | Y | | | | | | n3 |
| 1 | 1 | n3 | P | | | | | | | n4, n10 |
| 1 | 1 | n4 | R3 | Y | | | | | | DAC2/1 |
| 1 | 1 | n10 | R31 | Y | | | | | | DAC1/2 |
| 1 | 2 | n0 | B3 | N | | | | | | n13 |
| 1 | 2 | n13 | R31 | Y | | | | | | n14 |
| 1 | 2 | n14 | P | | | | | | | n15, n17 |
| 1 | 2 | n15 | R3 | N | | | | | | n16 |
| 1 | 2 | n16 | P | | | | | | | n10, end |
| 1 | 2 | n10 | R31 | Y | | | | | | DAC1 |
| 1 | 2 | n17 | R3 | Y | | | | | | n18 |
| 1 | 2 | n18 | P | | | | | | | n19, n31 |
| 1 | 2 | n19 | R31 | Y | | | | | | DAC2/2 |
| 1 | 2 | n31 | R31 | N | | | | | | DAC3/1 |
| 1 | 3 | n0 | B31 | Y | | | | | | n23 |
| 1 | 3 | n23 | R31 | Y | | | | | | n24 |
| 1 | 3 | n24 | P | | | | | | | n25, n26 |
| 1 | 3 | n25 | M | | | | | | | end |
| 1 | 3 | n26 | P | | | | | | | n27, n28 |
| 1 | 3 | n27 | X | | | | | | | end |

TABLE 1-continued

| DAC # (S) | Feeder # (F) | Node # (N) | Node type (T) | Contains 3-phase protection? (3P) | Maximum load capacity for the segment after (L) | Can it measure voltage? (V) | Can it measure load? (M) | Can it provide fault indication without a trip? (A) | Customer priority (Y) | Next node # or DAC #/Priority # (E) |
|---|---|---|---|---|---|---|---|---|---|---|
| 1 | 3 | n28 | R31 | Y | | | | | | n29 |
| 1 | 3 | n29 | R31 | Y | | | | | | DAC3 |
| 2 | 1 | n0 | B3 | Y | | | | | | n9 |
| 2 | 1 | n9 | P | | | | | | | n8 |
| 2 | 1 | n8 | X | | | | | | | n7 |
| 2 | 1 | n7 | P | | | | | | | n6, n12 |
| 2 | 1 | n6 | R3 | Y | | | | | | n5 |
| 2 | 1 | n5 | P | | | | | | | n4, n11 |
| 2 | 1 | n4 | R3 | Y | | | | | | DAC1/1 |
| 2 | 1 | n11 | R3 | Y | | | | | | DAC2/2 |
| 2 | 1 | n12 | M | | | | | | | end |
| 2 | 2 | n0 | B3 | Y | | | | | | n22 |
| 2 | 2 | n22 | R31 | Y | | | | | | n20 |
| 2 | 2 | n20 | P | | | | | | | n21, n19, end |
| 2 | 2 | n21 | R31 | Y | | | | | | n11 |
| 2 | 2 | n11 | R3 | Y | | | | | | DAC2/2 |
| 2 | 2 | n19 | R31 | Y | | | | | | DAC1/1 |
| 3 | 1 | n0 | B31 | Y | | | | | | n33 |
| 3 | 1 | n33 | P | | | | | | | n32, end |
| 3 | 1 | n32 | R3 | Y | | | | | | n30 |
| 3 | 1 | n30 | P | | | | | | | n29, n31 |
| 3 | 1 | n29 | R31 | Y | | | | | | DAC1/1 |
| 3 | 1 | n31 | R31 | N | | | | | | DAC1/2 |

As shown in Table 1, the column "DAC # (S)" indicates the assigned controller number for a referenced node. In some embodiments, there will be one physical controller per substation, but in cases where there will be more than one, there will be two distinct numbers. For substations without any physical controller, the control application creates logical ("feeder like") instances distinctly numbered, in one of the existing controllers.

The column "Feeder # (F)" indicates the assigned feeder number in a given controller, and is related to the feeder that supplies power to the referenced node. Each feeder may correspond to an associated controller instance.

The column "Node # (N)" is used to enter the name of the referenced node. In this example, each individual node is assigned a name "nx", such as n1, n2, etc. By convention, "n0" will always be the breaker in the substation, although any other desired naming convention may be used.

The column "Node Type (T)" indicates the type of the node. Exemplary indicators may include:
B3=breaker, three-phase control only
B31=breaker, three-phase with individual phase control capability
S3=remote controllable switch, three-phase control only
S31=remote controllable switch, three-phase with individual phase control capability
S1=remote controllable switch, single-phase
R3=remote controllable recloser, three-phase control only
R31=remote controllable recloser, three-phase with individual phase control capability
R1=remote controllable recloser, single phase
P=passive node
M=sensor
X=non-controllable remote switch If the sector does not require description of passive nodes due to homogenous load capacities in its segments, or does not require description of sensor or non-controllable elements, then such nodes need not be entered. In such a case, the load capacities will be the lowest ones out of all segments between P, X, M nodes. In one embodiment, passive nodes at "the end" of the network sector (but not terminating into an edge) need not be labeled and accounted for control application considerations, since no additional power may be routed through these passive end nodes. An "end" node refers to the node having no significant nodes thereafter.

The column "Contains 3-phase protection? (3P)" indicates whether the referenced node contains protection elements which will require setting changes prior to restoring single phases or multiple phases. The controller instance may use this flag to request a change in single phase protection settings, and receive confirmation back from the referenced node.

The column "Maximum load capacity for the segment after (L)" indicates the maximum current that can be supported by the referenced node and segment immediately after the referenced node (i.e. the segment following the referenced node and on the side of the referenced node away from the breaker) and before the next node. These values entered in this column may be used when performing load capacity calculations.

The column "Can it measure voltage? (V)" indicates whether the active node can provide voltage measurements at run time. The following values may be used:
0=NO
1=YES, separate for each of the three phases
3=YES, one value common for all three phases
A,B,C=only for the indicated phases The column "Can it measure load? (M)" indicates whether the active node can provide load (currents) measurements at run time. The following values may be used:
0=NO
1=YES, separate for each of the three phases
3=YES, one value common for all three phases
A,B,C=only for the indicated phases The column "Can it provide fault indication without a trip? (A)" indicates whether the active node can provide fault indications at run time, even if the switch position remains closed. The following values may be used:
0=NO
1=YES, separate for each of the three phases 3=YES, one value common for all three phases
A,B,C=only for the indicated phases A fault indication without a trip may result, for example, from an "arm" condition from a recloser.

The column "Customer priority (Y)" indicates the priority value assigned to each segment immediately after an associated node. For example, "NULL" indicates that the priority does not matter, and numbers indicate priority, with the value "1" indicating the lowest priority. This information may be used at run time to determine optimum isolation in cases where available power is not sufficient to restore power to all isolated segments following the faulted segment. Providing distinct priorities, at least in the edge segments, allows for user control over the control application decision process.

The column "Next node #, or, DAC #/Priority # (E)" indicates the next node or nodes following the reference node when parsing the circuit path from the breaker toward an edge of the sector. This value may include a node number, multiple node numbers, "end" (for an end of the circuit, i.e. there is nothing significant after the current node), and a controller number (i.e., DAC#) and associated priority for restoration. For example, the value of 1 may indicate a highest priority.

Using the above approach, any type of network layout may be accurately described in very simple terms. Also, the layout of each sector may be described in identical code among all controller instances. Changes in sectors belonging to one controller will not require re-building of configurations in other controllers.

In one embodiment, the control application may use the configured array data, such as that provided above in Table 1, to build data arrays describing the characteristics of each network component. Such arrays allow for a limitless number of interconnecting ties, segments, feeders or substations. Description of the configuration of a network can be achieved by simple description of the network sector topologies associated with each controller instance. Each controller instance does not need to know the configuration of the sectors associated with peer controllers, since the intended message exchanges use identical naming conventions.

In one embodiment, the control application describes the network, and various portions thereof, in various arrays. Such portions include contiguous segments, segment paths representing the best power routing capability, segments that will not accept additional power transfers, and new or revised network topologies.

In the example provided in conjunction with Table 1 and corresponding FIG. 1, Controller 101 is assigned controller number "DAC 1", controller 102 is assigned controller number "DAC 2", and controller 103 is assigned controller number "DAC 3". Table 2 is provided to demonstrate the exemplary names given to each node in network 100 according to the present example. As discussed above, each breaker is given the name "n0", and may be identified by its associated DAC and Feeder numbers.

TABLE 2

| FIG. 1 Reference | Node # (N) |
|---|---|
| 301 | n0 |
| 302 | n1 |
| 303 | n2 |
| 304 | n3 |
| 305 | n4 |
| 306 | n5 |

TABLE 2-continued

| FIG. 1 Reference | Node # (N) |
|---|---|
| 307 | n6 |
| 308 | n7 |
| 309 | n8 |
| 310 | n9 |
| 311 | n0 |
| 312 | n10 |
| 313 | n11 |
| 314 | n12 |
| 315 | n34 |
| 316 | n0 |
| 317 | n13 |
| 318 | n14 |
| 319 | n15 |
| 320 | n16 |
| 321 | n17 |
| 322 | n18 |
| 323 | n19 |
| 324 | n20 |
| 325 | n21 |
| 326 | n22 |
| 327 | n0 |
| 328 | n0 |
| 329 | n23 |
| 330 | n24 |
| 331 | n25 |
| 332 | n26 |
| 333 | n27 |
| 334 | n28 |
| 335 | n29 |
| 336 | n30 |
| 337 | n31 |
| 338 | n32 |
| 339 | n33 |
| 340 | n0 |

The control application may utilize the configured array data, such as described above in conjunction with Table 1, and build additional array elements having parameters configured to represent various properties of each node. Such properties may include, but are not limited to, the name of the active node, previous nodes, following nodes, whether the node is a branch node, node type, isolation priority, whether the node has three-phase protection, maximum load capacity, run time voltage, real time load, load values prior to fault, run time switch position, last position before a fault, and recloser locking indication.

The following example illustrates an example of an array element that may be built by the control application for one or more nodes. This example also describes exemplary naming conventions for various data elements. In this example, the control application includes a configurator tool that builds data arrays in the form of A(s,f,n), where s=station #, f=feeder # and n=node number. Node number "n" or "nx" may be used to describe any node in the network, including active nodes such as switches and passive nodes such as sensors. "0" (zero) may be used to identify a breaker in a referenced substation.

Each array element A(s,f,n) may have various parameters represented by the following data elements, and presented in an exemplary array naming convention as:

{name,d,e,r,t,y,3p,1,va,vb,vc,ia,ib,ic,ja,jb,jc,qa,qb,qc,ka, kb,kc,za,zb,zc,ba,bb,bc}

Each data element is described as follows.

"Name" refers to the name, number or description of the referenced node, which may be inherited from a user's entry, such as that entered in Table 1.

"D" refers to one or more previous switches or other nodes, each of which may be represented in array naming convention as "A(s,f,n)". For the breakers, which have no previous node in the network, this property will be NULL. This value may be calculated by the control application.

"E" refers to one or more switches or other nodes following the referenced node, which may be represented in array naming convention as "A(s,f,n)". This value may be calculated by the control application in the form of a directly addressable array identification. The value "end" indicates that the current node is at an end of the sector. "DAC x/p", which is assigned to an edge node, is a pointer to another DAC x with a priority p. For example, Node n(1,1,n4) of FIG. 1 represents node 305 at the edge of sector 211, which is fed by feeder 11. According to this example, node 305 would thus have an "E" value of E(1,1,DAC2/1), where "DAC2/1" indicates controller DAC 2 having a priority of 1. This value may be re-calculated by the control application, if desired, into some more appropriate machine-readable type.

"R" indicates whether the referenced node borders a branch. This value will be NULL (or 0) for all nodes except those directly bordering branches. Passive nodes inside a branch may also be assigned a value R=NULL (or 0). The control application may calculate this value to be used for quickly identifying splits in the sectors, as well as all the active nodes bordering split segments (branches). In this embodiment, when starting from the breaker, the control application will find the first node which is a branch root. If this branch root node is not an active node (i.e. the node type is other than an S or R type node such as S31 or R31), the control application will then determine the closest active node in the sector between the breaker and the passive branch root node (i.e., upstream). In this example, this node is assigned a value of "Nbr". The control application will then determine all active nodes that constitute the split borders towards the normally open switches (i.e., downstream). The downstream border nodes may be assigned values such as "Nb1", "Nb2", etc. For the Nbr node, "R" may have a value representing ALL of the downstream border nodes Nb1, Nb2, etc., in the form of:

R(s,f,Nbr)={(s,f,Nb1), (s,f,Nb2), etc.}

These values are the "addresses" of the downstream active nodes, i.e., the downstream borders of the branch. A branch root active node will, in this naming convention, always have at least two sets. For each downstream border node (Nb1, Nb2, etc.), "R" will have a negative value, directly pointing to the branch root active node. For example:

R(s,f,Nb1)={−(s,f,Nbr)}
R(s,f,Nb2)={−(s,f,Nbr)}

A downstream branch border active node will always have only one set (there can only be one branch root).

"T" refers to the node type, which may be inherited from the user's entry.

"Y" refers to the isolation priority, which may be inherited from the user's entry.

"3P" indicates whether the current node contains three-phase protection that would require settings to be changed for single-phase or dual-phase processing. This value may be inherited from the user's entry.

"L" refers to the maximum load capacity, which may be inherited from the user's entry.

"Va", "Vb", "Vc" refer to the real time voltage in the referenced node, per phase (i.e. phases a, b and c), acquired at run time. The control application may use these fields to determine whether these values are distinct for the three phases (for V=1), three-phase with one common value (V=3), individual values for one or more phases (V=A, AB, etc.), or not available (V=0).

"Ia", "Ib", "Ic" refer to the real time load (i.e., measured current), per phase, acquired at run time. The control application may use these fields to determine whether these values are distinct for the three phases (for M=1), three-phase with one common value (M=3), individual values for one or more phases (M=A, AB, etc.) or not available (M=0).

"Ja", "Jb", "Jc" refer to the real time load measurements, per phase, prior to a fault. The control application, at run time, will store the last load values (I) in this field, which were recorded just prior to the fault.

"Qa", "Qb", "Qc" refer to the run time position of the referenced node, per phase. These flags may be assigned values representing "open" or "closed", such as: open=0 and close=1. The control application may use these fields to determine whether these values are distinct for each phase or a common value for all phases, depending on the T value (S1, S3, S31, R1, R3, R31).

"Ka", "Kb", "Kc" refer to the last position (Q), per phase, of the referenced node prior to a fault. The control application, at run time, will store the last position values in this field, just before the fault.

"Za", "Zb", "Zc" refer to a real time fault indication, per phase (e.g., true=1, false=0). The control application may populate the corresponding values at run time. The control application may use these fields to determine whether the corresponding values are distinct for the three phases (A=1), three-phase with one common value (A=3), individual values (A=A, AB, etc.), or not available (A=0).

"Ba", "Bb", "Bc" refer to a real time locking indication from a recloser, per phase (e.g., true=1, false=0). The control application populates this flag with the corresponding values at run time. The control application may use this flag to determine whether the locking indication value(s) are three-phase distinct values or common based, depending on the T value (R1, R3, R31).

In one embodiment, normally open switches (i.e., edge nodes) are configured with the same name in adjacent controller instances, so that when referenced by name, either controller instance will address each normally open switch correctly. This common naming convention allows for each controller to easily and accurately identify the normally open switches referenced in peer requests among the controllers.

Figure 4:
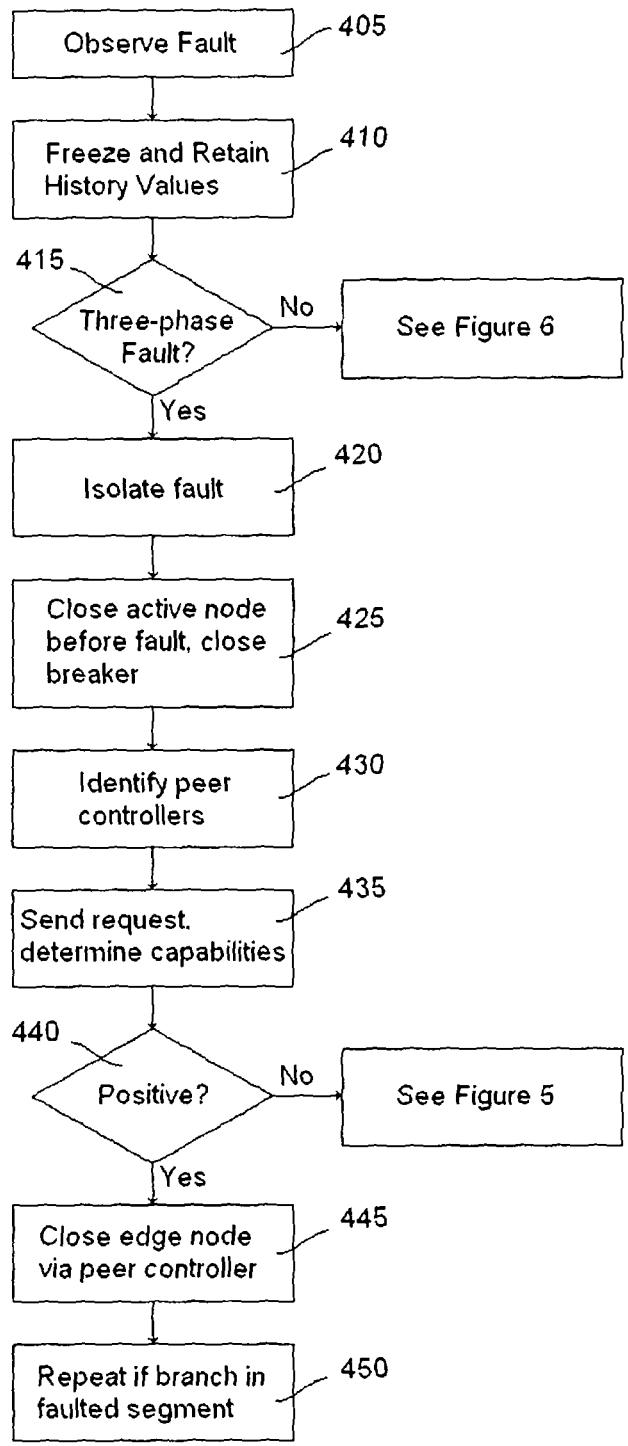
FIG. 4 is a flow diagram illustrating an embodiment of a method of isolating a faulted segment in an electrical power distribution network and restoring power to one or more isolated segments in the network.

FIG. 4 illustrates a method 400 for automatic reconfiguration of network topology in response to a fault, which includes one or more stages 405-455, and which may be performed by execution of the control application associated with a network controller that experiences a fault in a respective sector. The method isolates one or more faulted segments while maintaining maximum power service to as many segments as possible, by communicating with other controllers to re-route segments (and customers) to other power feeds. The control application automatically determines the suitable new topology for the power distribution grid. Faults may be three-phase or single phase, and the method may be capable of restoring power in three-phase segments, as well as in individual phases, depending on the configuration and capabilities of the nodes.

In one embodiment, instances of the control application run in each controller and constantly monitor all values, including the load in each node and the switch position of each node in a sector, and store an immediate previous time history of at least the load and switch positions of each node. One controller instance may be provided for each network sector.

Figure 2:
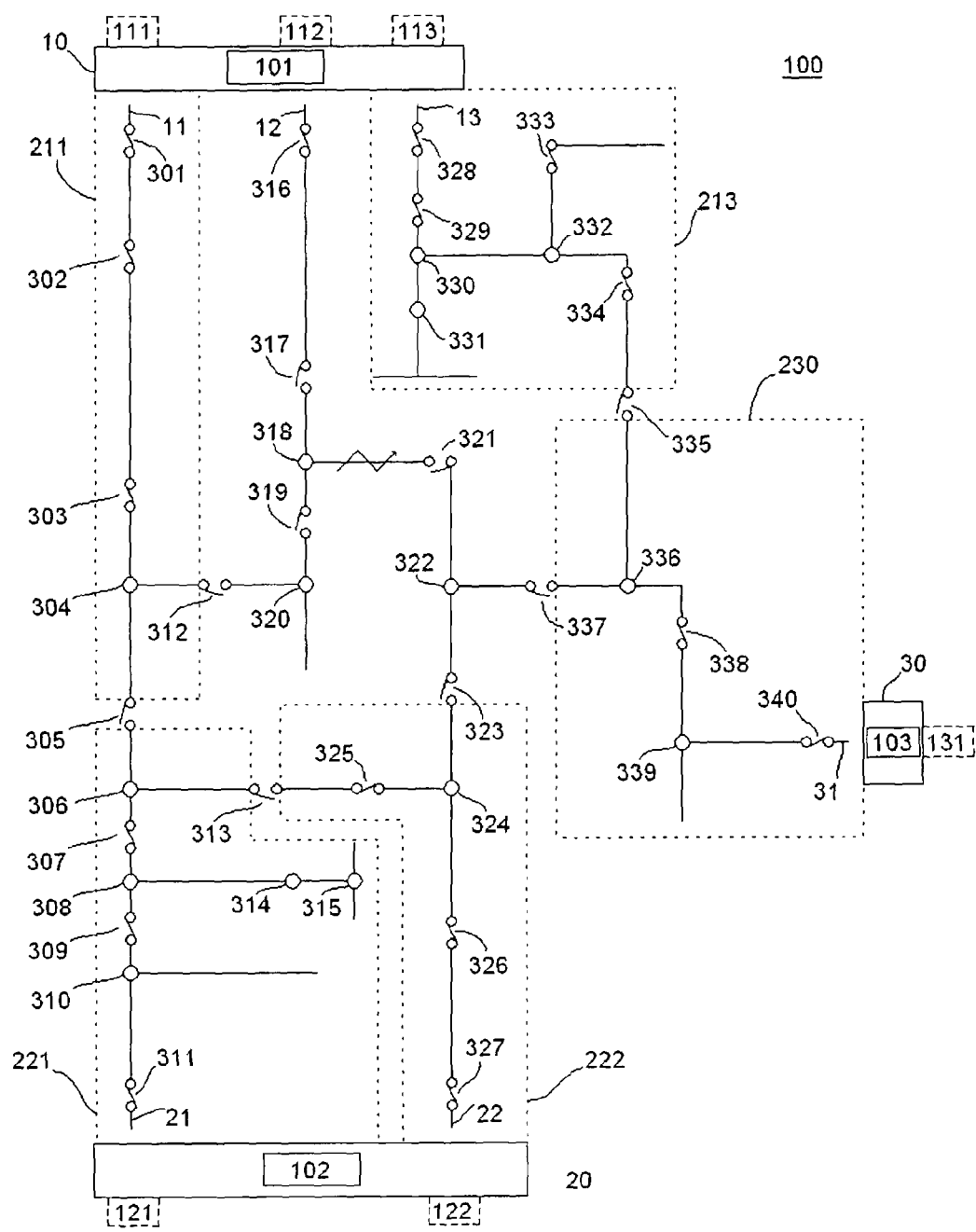
FIG. 2 is an illustration of an electrical power distribution network of FIG. 1 including an isolated faulted segment.

In stage 405, the control application observes a fault. This may be accomplished by receipt of a fault indication or trigger condition from an active node. A trigger condition may include a loss of voltage in one or more nodes, tripping of the substation breaker and locking of a recloser, and tripping and locking of reclosers in a sector. In one example, described in conjunction with FIG. 2, the instance of the control application associated with controller instance 112 (referred to hereafter as "controller 112") detects a fault in the segment between nodes 317, 319 and 321, as shown in FIG. 2. The fault indication may be in the form of a fault indication transmitted from recloser switch 317, detection of a voltage drop through switches 317, 319 and 321, and/or detection of the tripping and locking open of switch 317.

In one embodiment, if the control application detects a loss of voltage in a node (single or multiple phase), it will also look to the same phases in consecutive nodes, to all phases in consecutive nodes, or to all phases in the sector. A single loss of voltage in a middle node, but not in higher nodes, may be alarmed as equipment failure and will not trigger isolation (also referred to as "sectionalization") or restoration processes as described in method 400. In other embodiments, if a fault causes a breaker to trip before a recloser opens (if a breaker is connected in series with one or more reclosers), the control application will identify that this indication falsely implies that the fault was "before" the recloser. The control application will compensate by monitoring recloser points that indicate a fault but have not tripped. If such points are not available, or if this monitoring otherwise fails, the control application will place fault indicators where a normally open switch (edge node) is located, so when the normally open switch is closed to restore power to isolated segments, the control application will see a close on fault, and then re-assess the scenario. In another embodiment, if one of the main substation feeds is lost due to the loss of the high voltage feed to a breaker in the substation, the control application will detect this by monitoring multiple losses of voltage in the active nodes of a sector, or at the normally open switch (if the normally open switch includes voltage sensors), and will trigger the isolation and restoration method 400.

In stage 410, upon observation of a fault, the control application (or instance of the control application residing in the affected substation controller) will freeze and keep the immediate pre-fault time history values intact for all the nodes. The controller instance, i.e., the trigger controller, will then read all nodes reporting a fault and determine the last active node before the fault, i.e., the active node between the breaker and the fault that is closest to the fault. For example, this last active node is referred to as "node n0", and may be represented in naming convention as A(s0,f0,n0) or n(s0,f0,n0). In the present example, controller 112 ceases recording run time values of the nodes in sector 212, retains the historical values of each node, and determines that node 317 is "node n0".

In stage 415, the trigger controller may determine whether the fault was single-phase or multiple-phase. The fault may be considered three-phase if a fault is reported in all three phases of at least one node having individual phase capability and located between the breaker and node n0. The fault is determined to be single or dual phase if only a single-phase or dual-phase fault is reported by all nodes between the breaker and node n0 having individual phase capability. Single or dual phase faults may be treated as three-phase faults if the active nodes on each side of the fault do not having individual phase capability (i.e., all phases are commonly controlled).

The trigger controller then proceeds to process the fault, by initiating isolation and restoration processes, in order to restore power to as many segments (and associated customers) as possible. In one embodiment, the control application will process only one fault in one sector at a time. However, multiple controllers or controller instances may independently process multiple faults in very fast sequence, therefore appearing to the end user as "simultaneous".

In stage 420, the trigger controller initiates an isolation process to isolate the fault. The trigger controller 111 may issue a broadcast message to all other controllers, i.e., peer controllers, to inform them of this. Such a broadcast may be in any message format to all peer controllers, and need not be in a particular form. The broadcast is not limited to the form of a broadcast as understood in internet protocol networks.

The trigger controller isolates the faulted segment by opening the appropriate nodes around the faulted segment. In particular, the trigger controller opens the last active node before the faulted segment, and all active nodes immediately following the faulted segment. In one embodiment, if the node n0 is a branch root, all active nodes immediately following the faulted segment are opened. In the present example, controller 112 opens nodes 317, 319 and 321 to isolate the faulted segment, as shown in FIG. 2.

The trigger controller then initiates a restoration process, which may be accomplished in two stages. Stage one restoration is responsible for restoring power to segments "before" the faulted segment (i.e., between the breaker and the faulted segment), not including the faulted phase(s) segment. Stage two restoration is responsible for restoring power to segments "after" the faulted one, not including the faulted segment.

In stage 425, the trigger controller restores power to all segments before the faulted segment, by closing all phases of active nodes between the breaker and node n0, and by closing the breaker. In this example, controller 112 simply closes breaker 316, as there are no active nodes between breaker 316 and node 317.

The trigger controller then proceeds to initiate a restoration process to restore power to as many of the isolated segments as possible between the node or nodes where the faulted segment ends and the sector's edges. In stage 430, the trigger controller identifies peer controllers that include a circuit that could be connected to restore power to isolated segments. In the present example, controller 112 identifies peer controllers 111, 122 and 131.

In stage 435, in order to restore power to these segments, the trigger controller issues requests to the peer controllers in charge of the edge nodes that may be closed to provide power to the isolated segments. If multiple peer controllers are found, the power provided to the isolated segments may be distributed if the highest priority peer controller will not suffice (because of power restrictions in the peer sector, or within the capability of segments to be restored). The trigger controller may send requests for power availability info to all peer controllers found. The trigger controller receives replies from each peer controller, and determines, progressively starting with the highest priority peer controller to the lowest priority peer controller, whether each controller can provided sufficient power required by the isolated segments.

In stage 440, each peer controller may then respond affirmatively or negatively based on the maximum load that each peer controller can provide, and based on the power capabilities of the segments in the flow path between the peer controller and the isolated segments. For example, if a peer controller can provide power to the isolated segments without exceeding its maximum load, it will reply in the affirmative. Likewise, the peer controller will reply in the negative if restoring power to those segments would exceed the maximum load.

In one embodiment, if multiple choices exist (multiple edge nodes to be closed by one peer or by multiple peers), the trigger controller sends request messages one at a time. The order of choices may be decided by priorities entered in the configuration at configuration time. In another embodiment, the trigger controller need only reference the edge node name (number), even for edge nodes connected to the same controller on both sides, since the message contains the originator feeder name (number). This aspect allows for reconfigurations of sectors and feeders associated with one controller without requiring re-configuration in peer controllers.

If the peer controller replies in the affirmative, then the peer controller can supply sufficient power. The control application may then determine whether each segment in the flow of power from the respective peer controller to the isolated segment can handle the power supplied by the peer controller.

In stage 445, if the peer controller replies positively, and all the segments and nodes between the peer controller and the isolated segment can handle the required load, the control application will proceed to close appropriate nodes to supply power to the affected segments.

Referring again to FIG. 2, in the present example, controller 112 issues requests to peer controllers 122 and 131 for power availability to supply a load to the segments between 321, 323 and 337. Preferably, the requests are issued to each peer controller in an order based on the desired priority setting. The control application determines that controller 122 can supply sufficient power and that the segments in a flow path between controller 122 and the isolated segments can handle the power supplied by controller 122. Therefore, in response to request by controller 112, controller 122 closes switch 323 and supplies power to the segments between node 323 and the faulted segment. In one embodiment, in cases where a peer controller can not directly close the tie (decided at configuration time), the actual close command may be routed in SCADA through the trigger Controller; the control application functionality will not change, only the routing in SCADA.

Alternatively, the control application may first determine whether the isolated segments can handle power from the peer controller, and then issue a simultaneous request for power availability and for closure of an edge node. For example, the request from the trigger controller 112 to the peer controller 122 may be in the form of "I am DAC=1, Feeder=2—can you close tie=n19 and supply a load=y on phases (A,B,C)? If YES—do it". Peer controller 122, which corresponds to DAC2 having a priority of 2 (higher than the priority of controller DAC 3, which has a priority of 1), is sent the first request by controller 112. Controller 122 may then respond either negatively (e.g., in the form of "No, can not do/NACK"), or positively by accepting the request and closing the corresponding edge node, and replying to the trigger controller with "ACK". If peer controller 122 cannot accept, it may reply in the form of "NACK, y2" where y2 will be the maximum load that the peer controller can provide. Alternatively, controller 112 may send the above request to peer controller 122, and peer controller 122 determines both its own power capability and the capability of the isolated segments prior to responding.

In stage 450, if there is a branch in the faulted segment, then the control application repeats the process for remaining isolated segments. The result will be either closing ties one by one, or with some ties remaining open. In the present example, the control application performs the same procedure as that performed above to restore power to the segments between 312 and 319. In this case, there is only one available peer controller, i.e., controller 111. The control application determines, as above, whether controller 111 can supply sufficient power, and whether all segments in the power flow between controller 111 and node 319 can handle the supplied power. In this example, the control application makes a positive determination, and controller 111 closes switch (edge node) 312 to supply power to the remaining segments.

Figure 5:
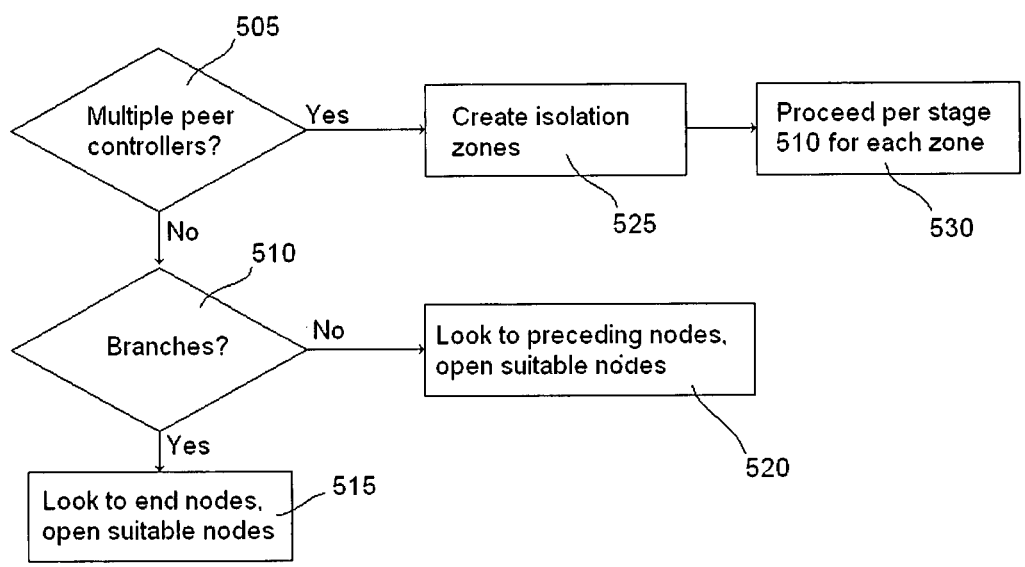
FIG. 5 is a flow diagram illustrating another embodiment of the method of FIG. 4.

Referring to FIG. 5, in the instance that power capacity is not available from any of the peer controllers, or if one or more segments in the flow path cannot handle the required power capacity, the control application will proceed with a method 500 to reduce the number of segments to be restored, or if multiple peer controllers (real or logical) are available, the control application will split the power supplied to the isolated segments between multiple controllers.

In one embodiment, when a peer controller cannot accept a request from the trigger controller, it will reply negatively, for example, in the form of "NACK, y2" where y2 will be the maximum load that the peer controller can provide. If it is not possible to restore all possible segments, the control application will "decrease" the area to be restored by considering fewer segments, which may be based on the "y2" values received from the peer controllers.

In stage 505, the control application notes whether there is more than one peer controller available. If there is a branch in the faulted segment, then there will be multiple peer controllers available. If there is no branch in the faulted segment, then there is only one peer controller available.

In stage 510, if only one controller is available, the control application may reduce the number of segments to be restored. If only one controller is available, the control application determines if there are branches connecting multiple end segments in the faulted segment.

If so, in stage 515, the control application then looks at any existing end nodes located among the isolated segments (in order of priority) and determines if any have a required load capacity that exceeds the power capability of the peer controller and/or the minimum load capacity of the circuit between the peer controller and the faulted segment (i.e., the "restoration circuit". If so, the highest priority edge node is selected, and the trigger controller requests that this node be opened. The control application may then determine whether the peer controller can supply power. If so, the trigger controller then sends a request to close the edge node. If the peer controller cannot supply power, then the control application repeats this process for additional end nodes.

In stage 520, if no branches are found, or if closure of end nodes does not render the restoration circuit suitable for providing power thereto, the control application looks successively to the active nodes immediately after the node bordering the faulted segment, and determines whether the peer controller can supply sufficient power to the associated segment. The control application proceeds in this way until an active node is found that can both handle the power capability of the peer controller and does not exceed the power capacity of the peer controller. This node is then opened, and the trigger controller requests that the peer controller close its edge node. If no active nodes are found prior to the edge node, then the edge node remains open.

In this way, the control application "increases" the isolated area (i.e. decreases the number of segments that are restored. Thus, in addition to segments directly faulted, other segments at the sector's edge may not be restored due to insufficient power handling capability.

In stage 525, if multiple edge nodes and peer controllers are available, due to a branch inside the faulted segment, the control application opens the active nodes bordering the branch after the faulted segments, creating multiple zones bounded by the border nodes and the edge nodes. In stage 530, the control application then proceeds as above, with the possible result of having multiple isolated zones due to power restrictions.

Figure 3:
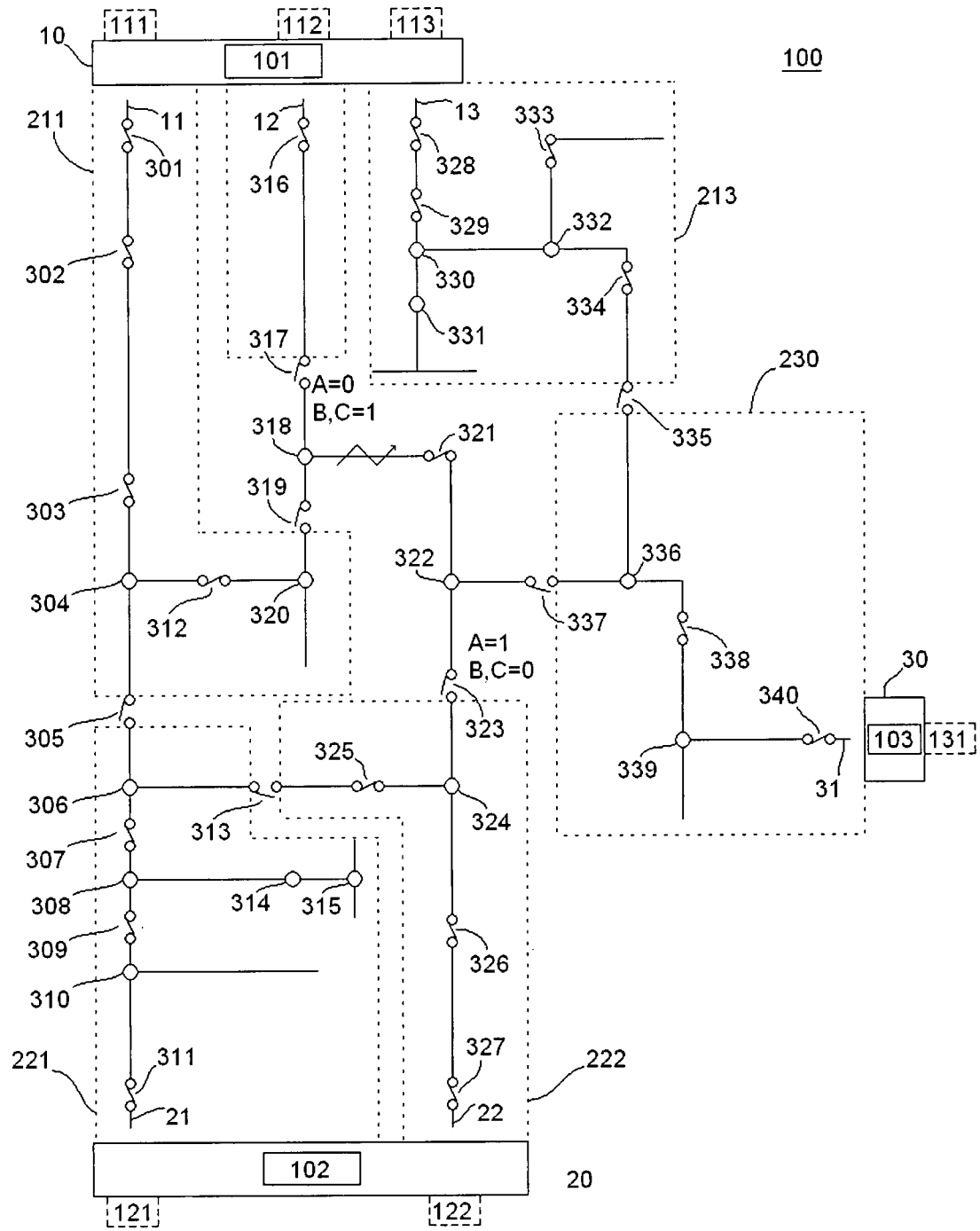
FIG. 3 is an illustration of an electrical power distribution network of FIG. 2 showing single-phase restoration of segments proximate to the faulted segment.
Figure 6:
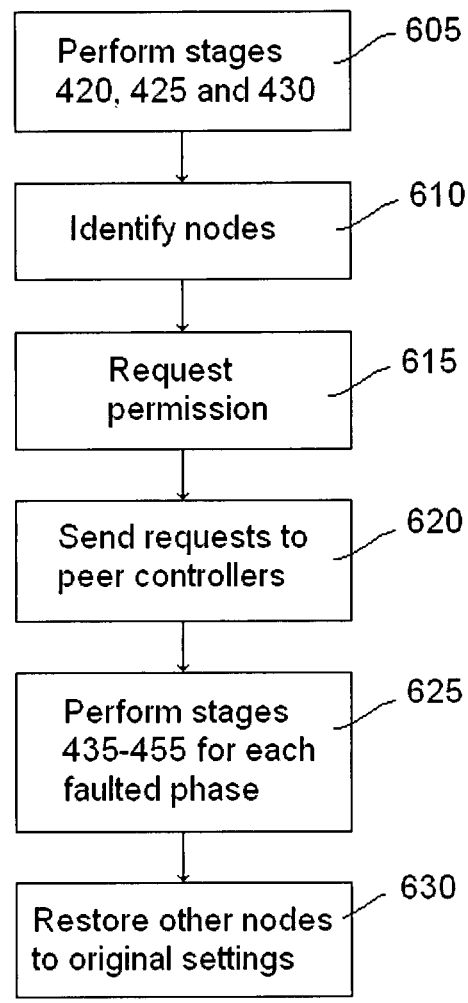
FIG. 6 is a flow diagram illustrating another embodiment of the method of FIG. 4.

Referring to FIG. 6, faults may be processed using non-three-phase (single or dual phase) restoration, so as to not interrupt customers that did not see a fault. In one embodiment, if single or dual-phase restoration is not possible, then three-phase restoration is performed as in method 400. FIG. 6 illustrates an alternative method 600, in which the control application is configured to restore power in either three-phase or non-three-phase. The following method will be described in conjunction with an example, in which the fault shown in FIG. 2 is a single phase fault, i.e., a fault in phase A of the segments between nodes 317, 319 and 321. FIG. 3 shows the new network topology of network 100 after method 600 is performed.

In stage 605, after the control application determines that the fault is single or dual phase, the trigger controller performs isolation and initial restoration procedures as in stages 420, 425 and 430. For example, controller 112 receives a fault indication from an active node, such as 317 in sector 212, and isolates the faulted segment, as shown in FIG. 2, by opening nodes 317, 319 and 321. Controller 112 also proceeds to identify peer controllers as in stage 430.

In stage 610, the controller identifies those nodes capable of performing single-phase operations. Such nodes should have distinct feedback, measurements and controls, using one set for each phase. If no nodes involved in the restoration have non-three-phase capability, the control application will proceed as in method 400. In the present example, the control application identifies nodes 317, 323 and 337 as having single-phase capability.

In one embodiment, in stage 615, before sending any restoration commands to the active nodes or to peer controllers, the trigger controller issues requests for changing the protection settings of the appropriate three-phase protection to all applicable active nodes as well as to the applicable (and configured) devices (e.g. breaker, bus, etc.) located in the substation. Each active node and substation device issues a confirmation message when the settings have been changed. In the present example, controller 112 issues requests to change the protection settings for nodes 317, 323 and 337 and receives the required acknowledgements.

In one embodiment, all controllers that requested three-phase protection settings changes shall wait for a selected time duration to receive all confirmation messages from all devices that are part of the request. Only if all confirmations have been received before the selected time-out will the non three-phase restoration proceed to the next stage. In one embodiment, the confirmation messages from protection devices are in a simple digital input form (e.g. 0=no, 1=yes).

If not all confirmations have been received back from the protection devices, then the control application (running in the trigger controller) may either inform the control center and ask the operator if a three-phase restoration shall be performed, or may automatically proceed to three-phase restoration.

In stage 620, the trigger controller may send requests to each peer controller to determine whether each peer controller can handle the power requirements and close the associated edge node in one or more individual phases. This request may be performed at the same time as stage 615. The requests may be in the form of, for example, "I am DAC=2, Feeder=1—can you close tie=x and supply a load=y on phases (A,B,C)? If YES—do it", for all phases, or "I am DAC=2, Feeder=1—can you close tie=x and supply a load=y on phases (A)? If YES—do it", where an individual phase "A" is requested.

In stage 625, once all confirmations have been received back from the protection devices (all=1), the controllers shall issue the appropriate individual phase open and close orders to the corresponding active nodes. The control application will proceed according to stages 435-455 for each faulted phase.

In stage 630, the trigger controller will restore additional nodes, not included in the restoration methods, to their original settings.

Referring again to FIG. 3, in the present example, controller 112 performs the method for restoring power to the isolated segments between nodes 321, 323 and 337. Edge node 323 is identified, and phase A of 323 is closed to restore phase A power to isolated segments. Node 317 has phase A opened, and phases B and C are returned to their original position prior to the fault. The segment between nodes 312 and 319 is restored based on the three-phase method.

In one embodiment, individual phase restoration includes continuous feedback from the protection systems. If, during individual phase restoration, any of the protection devices sends a message indicating the initial three-phase protection setting is active again for all three phases, or if the control application is still in non-three-phase mode, the control application shall raise an alarm and lock.

In one embodiment, for non three-phase faults, and where nodes are capable of switching individual phases, the desired result of the method may not simply be reducing the number of isolated segments. As some segments may have small power consumptions in comparison to other ones, it may be possible to isolate a large number of segments while maintaining power for most customers, e.g., if relatively few segments feed large numbers of customers. In other embodiments, segments may be assigned a high priority, for which only three-phase isolation and restoration will be applied even in the case of non-three-phase faults.

In one embodiment, for any of the methods described herein, if no peer controller accepts (e.g., reply in the form of "No, can not do/NACK"), or if a request from the trigger controller times out, for all peer controllers one by one, then the trigger controller shall eventually abort the restoration process, and raise appropriate alarms and indications to the control center. The automatic restoration shall not proceed further.

In one embodiment, the control application requires knowledge of the segments where three-phase customer loads exist. Such three-phase customers may have, for example, large three-phase motors or transformers that require three-phase power. The control application should not perform single-phase automatic restoration for these segments, to avoid the possibility of creating abnormal three-phase conditions that could lead to the damage or losses on three-phase equipment. This may be achieved, for example, by configuring only three-phase (e.g. R3) types of active nodes between these segments and the breaker and ties, thus restricting automatically any operations other than all phases.

In one embodiment, in the case of multiple faults in various sectors (either single or multiple phase), after the initial restoration session occurred, further faults can be processed in other sectors, but not in the sectors already part of automatic restoration. For example, an operator "DA reset" shall be required to revert back to the initial state.

In one embodiment, in cases where multiple faults may occur across completely different sectors in the same or different substation, each corresponding controller (including logical controllers) may trigger and attempt to restore independently. In another embodiment, each controller and associated segment may be assigned a priority for restoring higher priority customers first. In cases where certain sectors are higher priority then other ones, the control application may include a configuration parameter that will inhibit restoration by the controllers having a lower priority while another controller is in an active session. A "session" refers to a sequence of automated operations initiated by the control application in response to a power fault, that ends when all required topology changes have been accomplished or when the session is aborted. To avoid "race" conditions, there may be included appropriate configurable timers in place, so all controllers get the chance to receive the messages from the trigger controller.

The network 100 may be in communication with one or more remote control centers. In such an embodiment, each controller may inform the remote control center of what is being performed at any moment. For example, each controller instance may use an appropriate number of analog encoded values ("pseudo points") to inform the remote control center of what is being performed. Each state and stage of the control application may have unique associated values updated in real time in these analog pseudo points. Furthermore, each controller instance may accept commands from the control center, such as "reset" or "inhibit". In one embodiment, each controller instance may create events for important states, which may be relayed to the user and/or control center. Such events include, for example:
Reset
Triggered (in progress)—the trigger cause may be, for example, in A1 encoded values
Isolation start
Restoration Stage 1 start
Restoration Stage 2 start
Aborted—the reason may be via A1 encoded value
Successful (Restoration Stage 1 or Stage 2)
Waiting for operator confirmation In one embodiment, prior to replying to a request from the trigger controller, each peer controller may check the power requirements against historical data for the involved segments. If momentary power capacity exists for that segment but is found to be higher than certain maximum historical intervals, the peer controller may close the corresponding edge node, but will also inform the operator in the control center that a pending overload exists at, for example, hours "hh" (based on historical trends). Alternatively, the control application may ask first for operator permission and then close the edge node; in such a case the reply to the trigger controller may be in the form of "T-NACK", indicating that operator feedback is required. For example, the controllers may keep histories of per segment loads, like MAX every hour, for last 24 hours, so that if a restoration is OK, for example, at 2:00 AM, the control application may proceed with restoration but indicate to the operator that later in the day there will be loading issues, based on the history, or may first request permission to proceed with restoration.

The following examples (Examples 1, 2 and 3), illustrate the methods described above and provide exemplary use of commands and data exchanged between controllers and between controllers and active nodes.

Example 1: Initial Processing

A. The control application observes a fault, freezes and keeps the immediate (pre-fault time) history values intact for all arrays $A(s0,f0,n)$. The trigger condition is determined by, for example: i) noting a loss of voltage in a node (i.e. change in Vx value), ii) substation breaker tripped and the substation auto recloser locked (see Qx and Bx for $A(s,f,0)$), and/or iii) reclosers in the sector tripped and locked (see Qx and Bx for $A(s,f,n)$). The controller and feeder representing the faulted sector is referred to as (s=s0, f=f0).

B. The trigger controller reads all nodes reporting a fault (n) and finds the maximum value(s) of "n"=n0. The check may be based on Vx, Qx, Zx, and Bx—depending on the trigger type (for example, do not look for Bx if the trigger was based on voltage loss). Node n0 is represented by a set $n(s0,f0,n0)$ describing the identity ("ID") of the last node before the faulted area.

C. The control application determines whether the fault is to be considered three-phase. The fault is three-phase if i) all three phase indications (e.g., V, Z, Q, B) have been received in at least one node capable of independent phase control (type values of T=R31, T=S31, or voltage/load values of V=1 or A=1 between the breaker and n0), or ii) $T(s0,f0,n0)$ =S3 or R3 and all $T(s0,f0,n0)$=S3, R3 (i.e. the faulted segment's sides are all common 3 phase controlled). The fault is single or dual-phase if only a single or dual phase fault has been reported by all nodes capable of independent phase control between the breaker and n0 (T=S1,S31,R1, R31).

Example 2: Isolation and Restoration Process, Three-Phase

A. Instruct "OPEN ALL-PHASE" to $n(s0,f0,n0)$, receive ACK (acknowledgement) feedback.

B. If $n(s0,f0,n0)$ is not a branch root ($R(s0,f0,n0)$=0), then: OPEN ALL-PHASE for $E(s0,f0,n0)$. Mask the nodes having types T=P,M,X when finding E (i.e. look only for the higher active node). Receive ACK feedback.

C. If $n(s0,f0,n0)$ is a branch root ($R(s0,f0,n0)$< >0), look-up R for all downstream branch borders, then OPEN ALL-PHASE for all $(s0,f0,R(n0))$, receive ACK feedback from all.

D. If ACK feedback is not received and times out, the program is aborted and an appropriate alarm is raised. If all steps have been accomplished and all appropriate acknowledgements received, isolation of the faulted segment is now complete (i.e., the active nodes surrounding the faulted segment have been opened) and the control application proceeds to restore one or more of the isolated segments between the faulted segment and the edge node(s).

E. CLOSE ALL-PHASE $n(s0,f1, 1$ to $n0-1)$. Mask the node types T=P,M,X when finding (n0-1). Receive ACK feedback from all. If ACK feedback is not received and times out, abort the process and raise an appropriate alarm.

F. If all OK, close breaker $(s0,f0,0)$. Receive ACK feedback. Indicate "Restoration Stage 1" successful to control center/operator, and proceed to the next stage to of the restoration. If ACK feedback for the breaker is not received and times out, abort restoration and raise an appropriate alarm.

G. Determine whether the fault is inside a branch. If the fault is inside a branch, i.e., ($R(s0,f0,n0)$< >0), find the branch root and branch border active nodes (look inside "R"), and issue OPEN ALL-PHASE for all these; receive ACK feedback from all. Create a flag:

FAULT_IN_BRANCH=TRUE. If the fault was not inside a branch (R(s0,f0,n0)=0), then create a flag: FAULT_IN_BRANCH=FALSE.

H. Find peer controllers (DACs). Looking in the arrays, find all peer DACs "after" the faulted segment (look for E(s0,f0, all n)="DAC x/p") and place the values in an array in the form shown in Table 3:

TABLE 3

| Edge ID number (tie) | Edge ID name (tie) | Priority (p) | Peer DAC # (x) | Lowest branch border ID (0 if there are no branches between this DAC and the faulted segment) | Power that can be provided by this DAC |
|---|---|---|---|---|---|
| ndac1 | Name (s0, f0, ndac1) | 2 | 2 | Nb1 | PD1 |
| ndac2 | Name (s0, f0, ndac2) | 1 | 1 | 0 | PD2 |
| ndac3 | Name (s0, f0, ndac3) | 3 | 1 | Nb3 | PD3 |
| and so on . . . | | | | | |

If no peer DAC is found in this sector, then abort and raise an indication that restoration was not completed due to absence of power sources. If only one peer DAC was found, that means there is only one edge node to close and restore the power. If multiple peer DACs were found, that means there are branches in the segments to be restored.

I. The trigger DAC sends requests for power availability info to all peer DACs found, in the form of "I am DAC=s0, Feeder=f0—How much power can you give on tie=Name (s0,f0,ndac)?" The replies may be stored in the last column in the array shown in table 3, as a value of PDx. If the request timed out for a DACx, then PDx=0.

J. Starting with the highest priority peer DAC, the control application will check first if this DAC will be capable of supplying power: PDx>J(s0,f0,active E(s0,f0,n0)).

K. If the peer DAC can supply the power, check next if the segments that are part of the power flow between the peer DAC and node E(s0,f0,n0) can handle the required power. For this, find the "min L(s0,f0,u)" where u=is a set of values reverse parsed from "ndac" to "active E(s0,f0,n0)" (i.e. from the edge node associated with the respective peer controller to an active node following the faulted segment). By reverse parsing, only the segments directly part of the power transfer from the peer sector are considered. This will be the "weakest link" node in transferring the power from this peer sector.

K1. Check if "J(s0,f0,active E(s0,f0,n0))"<"min L(s0,f0, u)". If yes, that means even the weakest link can handle the overall power requirements. Use y=J(s0,f0,active E(s0,f0, n0)) and send the close tie request to this DAC #.

K2. If FAULT_IN_BRANCH=FALSE—then restoration is complete, with one closed edge node providing all the required power. Only the segments directly faulted have not been restored.

K3. If FAULT_IN_BRANCH=TRUE—then repeat the process steps (I)-(K2) for all remaining highest priority DACs after the faulted branch (if any). The result will be either closing ties one by one, or with some ties remaining open. If all edge nodes have been closed, the process is complete.

K4. If either the peer DAC cannot supply the required power, or if the "weakest link" node cannot handle the required power, proceed to step (L).

L. If power capacity is not available from the peer DAC, i.e., "PDx<J(s0,f0,active E(s0,f0,n0))", or power requirements are greater than what the weakest link in the flow path can handle, i.e., "J(s0,f0,active E(s0,f0,n0))">"min L(s0,f0, u)", the control application will proceed to reduce the number of segments to be restored.

M. If there is only one edge node, i.e., there is only one entry in the exemplary array (Table 3) above, then the only action remaining is to reduce the number of segments to be restored. The control application will look at the balance of power required, i.e, J(s0,f0,active E(s0,f0,n0))−min(PDx, L(s0,f0,u)) and will look for edge segments where J in those segments was higher. Therefore, by opening the active node where this condition is met, the required power to be restored will be within the possible limits of both the load capacities of the restored segments as well as the peer sector.

M1. If branches exist in the segments between the edge node and the faulted segments, find all active end nodes, i.e., nodes "n" where "Active E(s0,f0,n)"="end" (e.g. n_end1, n_end2, etc.). Such end nodes include active nodes having no significant components thereafter. An example of an end node shown in FIG. 2 is node 333. Build a data set containing the frozen load values J from end nodes and the associated customer priorities. Order this data set by customer priority. In ascending priority order, look for the active node having a frozen value J load capacity is higher than the balance of power. If a single active node to satisfy this is not found, then decrease the active node number, build the data set again and re-check. If an active node was found to meet the condition, that node will be issued OPEN ALL-PHASES, and wait for ACK feedback. Use y=J(s0,f0, active E(s0,f0,n0))−J(s0,f0,n_end) and send the close tie request to this DAC#. The peer DAC may then close the edge node. If the peer DAC ACKs the request and closes the edge node, then three-phase restoration is now complete with one closed edge node providing all required power. In addition to segments directly faulted, other segments at the sector's edge have not been restored due to insufficient power handling capability.)

If feedback is not received and times out, log an alarm then use the "n_end" next in line which matched the criteria and repeat OPEN ALL-PHASES, wait for ACK.

M2. If no branches are available, "increase" the isolated faulted area by looking to the next active node after the active node bordering the faulted sector. Check the J value for the next active node to determine if J in this node is lower than the power availability. If not, successively look to the active nodes following this active node. If the DAC limit is reached, that means no active node was found to compensate for the power restrictions. Use y=J(s0,f0,active E(s0,f0, n0))−J(s0,f0,n_pok) and send the close tie request to this DAC#. The peer DAC may then close the edge node. If the peer DAC ACKs the request and closes the tie, then restoration stage 2 on 3 phase is now complete with one closed tie providing all required power. In addition to segments directly faulted, other segments contiguous to the faulted ones have not been restored due to insufficient power handling capability.

If an active node meeting the power restriction condition is found (e.g., "n_pok"), then issue OPEN ALL-PHASES to this active node, and wait for ACK feedback. If feedback is not received and times out, log an alarm then go to the next active node and repeat OPEN ALL-PHASES, wait for ACK.

N. If multiple edge nodes and peer DACs are available, that means there are branches inside. Then the control application will open the active nodes at the branch border immediately after the faulted segment, towards the edge nodes (the ID of these is known from the array above). This will separate the area to be restored in multiple zones, with each zone now capable of receiving power from one tie. The control application will be now in a similar operating mode as "FAULT_IN_BRANCH=TRUE", above and will continue the process as described in steps (K4)-(M2).

Thus, as a result of the above method, in addition to the segments directly faulted, other isolated segments may or may not have been restored, depending on the power capability of each peer DAC and the load capacity of the isolated segments. In one embodiment, the control application will issue updates to a control center and/or user in detail after each attempt to close an edge node.

Example 3: Isolation and Restoration Process, Three-Phase

Initial processing may be performed as in Example 1. If the control application determines that the fault is in less than three phases, i.e. one or two phase fault, the control application proceeds as follows.

1. The control application in the trigger DAC identifies the faulted phase(s) into a data set entitled "F_PH (a,b,c)". "a, b and c" refer respectively to each of the three phases, where a,b,c=1 for faulted phases. The identification may be accomplished by looking at the Z and Q data associated with nodes between the breaker and n0.

2. The control application builds two new arrays derived from the main array, but with two masks applied:

F_A (s,f,n)=A(s,f,n) AND{F_PH} AND {active node types being T=S31, S1, R31, R1}.

The F_A (s,f,n) array is the array representing the active node faulted phases, which is considered for isolation and restoration, using methods as in three-phase faults (all inputs, commands and messages applicable to three-phase faults will be applicable to the faulted phases and to the active nodes capable of operating individually).

i. P_A (s,f,n)=A(s,f,n) AND NOT {F_PH} AND {active node types being T=S31, S1, R31, R1}.

The P_A (s,f,n) array will contain all "healthy" circuits, i.e. all healthy phases of the active nodes. All active nodes that are part of this array can be reverted to normal operational topology when the time comes.

3. The trigger DAC may request PROTECTION_PERMISSION from all n(s0,f0, any) part of F_A(s,f,n) where 3P=Yes. When asked by the trigger DAC for single phase protection permission, the peer DACs will request PROTECTION PERMISSION from their own 3P=Yes devices which are part of segments associated with the communicated edge node number. The replies may be compounded into one global "peer DAC reply" as ACK or NACK.

If not all permissions came back ACK, or if one or more permission requests time out (including peer DACs), the trigger DAC raises an alarm that "not all protection was ready, and will proceed using three phase isolation as in Example 2, steps A-D.

If ALL permissions come back ACK (including peer DACs)—then trigger DAC will use F_A(s,f,n) and perform isolation on each of the faulted phases. The process is performed for each faulted phase similar to Example 2, steps A-D.

4. Use F_A(s,f,n) and proceed to restore power to the phases of the segments preceding the fault, similar to Example 2. Trigger DAC will send CLOSE ALL-PHASE to all active nodes (s0,f0, 1 to n0-1). Receive ACK feedback from all. If ACK feedback is not received and times out, abort DA and raise an appropriate alarm. If all OK—then close the breaker (s0,f0,0). Receive ACK feedback. Indicate "Restoration Stage 1" successful, and proceed to step 5. If ACK feedback for the breaker is not received and times out, abort the restoration and raise an appropriate alarm.

5. Use the F_A(s,f,n) data array. Restore power to the segment phases following the faulted segment as described in Example 2, steps G-O.

6. Restore the phases represented in the P_A(s,f,n) data array to their normal operating topology.

The methods and systems described above and/or claimed herein pertain to any computer system having any number of memory or storage units, and any number of applications and processes occurring across any number of storage units or volumes, which may be used in connection with the methods and systems described above and/or claimed herein. Thus, the same may apply to an environment with server computers and client computers deployed in a network environment or distributed computing environment, having remote or local storage. The methods and systems described above and/or claimed herein may also be applied to standalone computing devices, having programming language functionality, interpretation and execution capabilities for generating, receiving and transmitting information in connection with remote or local services.

The methods and systems described above and/or claimed herein is operational with numerous other general purpose or special purpose computing system environments or configurations. Examples of well known computing systems, environments, and/or configurations that may be suitable for use with the methods and systems described above and/or claimed herein include, but are not limited to, personal computers, server computers, substation controllers, handheld or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and systems described above and/or claimed herein may also be practiced in distributed computing environments such as between different power plants or different power networks where tasks are performed by remote processing devices that are linked through a communications network or other data transmission medium. In a typical distributed computing environment, program modules and routines or data may be located in both local and remote computer storage media including memory storage devices. These resources and services may include the exchange of information, cache storage, and disk storage for files. In this regard, a variety of devices may have applications, objects or resources that may utilize the methods and systems described above and/or claimed herein.

Computer programs implementing the methods described may be stored in a portable storage medium such as a CD-ROM. The program could be copied to a hard disk or a similar intermediate storage medium in the controller or in a computer. When the programs are to be run, they will be loaded either from their distribution medium or their intermediate storage medium into the execution memory of the computer or processor, thus configuring a computer to act in accordance with the methods and systems described above.

Thus, the various techniques described herein may be implemented in connection with hardware or software or, where appropriate, with a combination of both. Thus, the methods and systems described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and systems of described above and/or claimed herein. In the case of program code execution on programmable computers, the computing device will generally include a processor, a storage medium readable by the processor which may include volatile and non-volatile memory and/or storage elements, at least one input device, and at least one output device. One or more programs that may utilize the techniques of the methods and systems described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and systems described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and systems of described above and/or claimed herein. Further, any storage techniques used in connection with the methods and systems described above and/or claimed herein may invariably be a combination of hardware and software.

A number of advantages, and technical contributions accrue from the above-disclosed embodiments, some of which are discussed below. For example, restoration may be provided dynamically, based on available power availability of the different substations, and need not be based on pre-configured rules.

The systems and methods described above do not require all field devices to be of the same type or supply. Different types of field devices may all be mixed as long as they can provide a common set of data. It provides expandability without the need for reconfiguring devices deployed across the network—only a controller in the substation where the expanded feeder is tied must be reconfigured.

The system can restore less than three phases if so configured and accepted by the power utility operator (in case of single phase customers).

Since the proposed method uses only multi dimensional array calculations, there are no limits in the number of interconnecting nodes, segments, feeders or substations. Thus, configuration can be achieved by simple description of the network topologies associated with a controller. Each controller need not know the configuration of the peer controllers, since the intended message exchanges use relative references.

The systems described herein are modular, and may be utilized in existing power substations having a variety of controllers. Thus, power utilities may install the system and maintain the system more easily, and with lower cost than prior systems. Furthermore, users such as power utilities may deploy the system without extensive re-configuration of existing power network systems, and may utilize the system and method without the need to take central system controllers offline.

The control application is modular so large distribution networks can be automated by implementing adjacent modules side by side. There is no central decision factor, all deployed controllers may contribute to the correct decisions. The control application may reside in multiple substation controllers, using identical code, and is configurable for any power distribution network layout.

While the methods and systems described above and/or claimed herein are described above with reference to an exemplary embodiment, it will be understood by those skilled in the art that various changes may be made and equivalence may be substituted for elements thereof without departing from the scope of the methods and systems described above and/or claimed herein. In addition, many modifications may be made to the teachings of above to adapt to a particular situation without departing from the scope thereof. Therefore, it is intended that the methods and systems described above and/or claimed herein not be limited to the embodiment disclosed for carrying out this invention, but that the invention includes all embodiments falling with the scope of the intended claims. Moreover, the use of the term's first, second, etc. does not denote any order of importance, but rather the term's first, second, etc. are used to distinguish one element from another.

The invention claimed is:

1. A system for controlling a multi-feed power distribution network, the network including a first network sector that includes a first plurality of devices distributed along a first feeder connected to a first power source via a plurality of nodes and one or more other network sectors that each include a plurality of devices distributed along feeders connected to power sources via a plurality of other nodes, the system comprising:

a first substation controller and one or more other substation controllers, wherein the first substation controller is configured to control operation of each of the first plurality of devices in the first network sector and exchange data with the one or more other substation controllers, and the one or more other substation controllers are configured to control operation of each of the plurality of devices in the one or more other network sectors; and a control application accessible by each substation controller and configured to store a variable size data array of topology data representing each of the first substation controller, the one or more other substation controllers, the first plurality of devices and the plurality of devices distributed along feeders, the control application being executed by either the first substation controller or the one or more other substation controllers to isolate one or more faults by controlling topology of the network based on the topology data and to restore power dynamically based on requesting and receiving power availability information and circuit capacity restrictions, wherein the requesting and receiving power availability information and circuit capacity restrictions is performed according to a priority list with a priority setting for each substation controller and wherein to isolate the one or more faults comprises opening one or more last active nodes before the one or more faults and opening all remaining active nodes immediately following the one or more faults and wherein to isolate the one or more faults further comprises opening one or more selected phases of one or more of a plurality of switches surrounding the faulted segment and wherein communication between the first substation controller and the one or more other substation controllers comprises requesting restoration of power to one or more isolated phases in the one or more isolated segments and wherein communication between the first substation controller and the one or more other substation controllers further comprises receiving power restoration capability from each of the one or more other substation controllers.

2. The system of claim 1, wherein each of the first and second pluralities of devices of the first network and the one or more other network sectors is selected from at least one of: an active node, a passive node, a controllable switch, a recloser, a circuit breaker, a network split, and a sensor.

3. The system of claim 1, wherein the exchanged data represents at least one of: a layout of the first sector, a layout of the second sector, a status of one or more of the first plurality of devices, and a status of one or more of the second plurality of devices.

4. The system of claim 3, wherein the exchanged data represents one or more individual phases.

5. The system of claim 1, wherein the first substation controller and the one or more other substation controllers are distribution automation (DA) controllers.

6. The system of claim 1, wherein the first substation controller and the one or more other substation controllers are Supervisory Control And Data Acquisition (SCADA) controllers.

7. The system of claim 1, wherein the first substation controller is associated with a first power network substation, and the one or more other substation controllers are associated with one or more power network substations.

8. A method for controlling a multi-feed power distribution network, the network including a first network sector that includes a first plurality of switches distributed along a first feeder connected to a first power source via a plurality of nodes and controlled by a first substation controller, and one or more other network sectors that each include a plurality of switches distributed along feeders connected to power sources via a plurality of other nodes and controlled by one or more other substation controllers, the method comprising:

generating a set of data, the set of data representing properties of each plurality of devices and a topology of the first and the one or more other network sectors;

generating and storing via a control application a variable size multi-dimensional data array for the first and the one or more other network sectors, the data array including a plurality of array elements, the plurality of array elements representing each of the first substation controller, the one or more other substation controllers and each plurality of devices;

receiving a fault indication in the first substation controller, the fault indication representing a fault in a faulted segment of the first sector;

the first substation controller isolating the fault in the first sector by controlling the topology of the first sector and opening one or more last active switches in the first sector that surround the faulted segment and opening all remaining active switches immediately following the fault; and the first substation controller communicating with the one or more other substation controllers to request restoration of power to one or more isolated segments in the first sector, the communicating with the one or more other substation controllers comprising the first substation controller requesting power availability information and circuit capacity restrictions from the one or more other substation controllers to dynamically restore the power, wherein the requesting and receiving power availability information and circuit capacity restrictions is performed according to a priority list with a priority setting for each substation controller, determining whether the faulted segment includes one or more individual faulted phases, wherein isolating the fault comprises opening one or more selected phases of the one or more of the first plurality of switches surrounding the faulted segment, and wherein communicating with the one or more other substation controllers further comprises requesting restoration of power to one or more isolated phases in the one or more isolated segments, and the one or more selected phases and the one or more isolated phases correspond to the one or more faulted phases and wherein communication between the first substation controller and the one or more other substation controllers further comprises receiving power restoration capability from each of the one or more other substation controllers.

9. The method of claim 8, wherein the one or more other substation controllers are configured to control the plurality of switches in the one or more other network sectors, and wherein the method further comprises restoring power to the one or more isolated segments via the one or more other substation controllers by closing one or more of the plurality of switches in the one or more other network sectors to restore power to one or more isolated segments.

10. The method of claim 8, further comprising determining whether the faulted segment includes one or more individual faulted phases.

11. A method for controlling a multi-feed power distribution network including at least a first network sector that includes a first plurality of devices distributed along a first feeder connected to a first power source via a plurality of nodes and controlled by a first substation controller, and one or more other network sectors that each include a plurality of switches distributed along feeders connected to power sources via a plurality of other nodes and controlled by one or more other substation controllers, the method comprising:

generating a set of data, the set of data representing properties of each plurality of devices and a topology of the first and the one or more other network sectors;

generating and storing via a control application a variable size multi-dimensional data array for the first and the one or more other network sectors, the data array including a plurality of array elements, the plurality of array elements representing each of the first substation controller, the one or more other substation controllers and each plurality of devices; and controlling operation of the first plurality of devices by the first substation controller using the data array, the controlling by the first substation controller including controlling based on the topology to isolate a fault in the first network sector and dynamically restoring power based on requesting and receiving power availability information and circuit capacity restrictions from the one or more other substation controllers wherein the requesting and receiving power availability information and circuit capacity restrictions is performed according to a priority list with a priority setting for each substation controller, wherein to isolate the fault includes opening one or more selected phases of one or more of a plurality of switches surrounding the faulted segment, communicating with the one or more other substation controllers comprises requesting restoration of power to one or more isolated phases in the one or more isolated segments, and the one or more selected phases and the one or more isolated phases correspond to the one or more faulted phases and wherein communicating with the one or more other substation controllers further comprises receiving power restoration capability from each of the one or more other substation controllers.

12. The method of claim 11, wherein the plurality of array elements includes indications of at least a status of each of the plurality of devices and a configuration of each of the plurality of devices; and
the method further comprises storing status data and configuration data for each of the first plurality of devices in a first data array, and storing status data and configuration data for each of the second plurality of devices in a second data array.

13. The method of claim 12, wherein the status data is selected from at least one of: real time status data and historical status data.

14. The method of claim 12, wherein the status data is selected from at least one of: a voltage, a measured current, a switch position, a fault indication, and a recloser lock indication.

15. The method of claim 12, wherein the configuration data is selected from at least one of: previous devices, next devices, branch information, a device type, a priority indication, three-phase protection, and a maximum load capacity.

16. A computer program product for controlling a multi-feed power distribution network including at least a first network sector that includes a first plurality of devices distributed along a first feeder connected to a first power source via a first plurality of nodes and controlled by a first substation controller, and a second network sector that includes a second plurality of devices distributed along a second feeder connected to a second power source via a second plurality of nodes and controlled by a second substation controller, the program product comprising:
a non-transitory tangible storage medium, readable by a processor, storing instructions for execution by the processor, the instructions for implementing a method comprising:
generating data representing properties of each of the first and second plurality of devices and a topology of the first and second network sector;
generating and storing via a control application a variable size multi-dimensional data array for the first and second network sector, the data array including a plurality of array elements, the plurality of array elements representing properties of each of the first substation controller, the second substation controller, the first plurality of devices and the second plurality of devices; and
controlling operation of the first plurality of devices by the first substation controller using the multi-dimensional data array, the controlling by the first substation controller including controlling based on the topology to isolate a fault in the first network sector and dynamically restoring power based on requesting and receiving power availability information and circuit capacity restrictions from the second substation controller, wherein the requesting and receiving power availability information and circuit capacity restrictions is performed according to a priority list with a priority setting for each substation controller and wherein isolating the fault includes opening one or more last active nodes before the one or more faults and opening all remaining active nodes immediately following the one or more faults, wherein isolating the fault further includes opening one or more selected phases of one or more of a plurality of switches surrounding the faulted segment, communicating with the one or more other substation controllers comprises requesting restoration of power to one or more isolated phases in the one or more isolated segments, and the one or more selected phases and the one or more isolated phases correspond to the one or more faulted phases, and wherein communicating with the one or more other substation controllers further comprises receiving power restoration capability from each of the one or more other substation controllers.

17. A method for controlling a multi-feed power distribution network including at least a first network sector that includes a first plurality of devices distributed along a first feeder and connected to a first power source and controlled by a first controller, the method comprising:
receiving data directly from each of the first plurality of devices at the first controller and generating a first set of data representing properties of each of the first plurality of devices;
converting, at the first controller, the first set of data into a first variable size, multidimensional dynamic first data array for the first network sector, the first data array including a first plurality of array elements, each of the first plurality of array elements representing properties of one of the first plurality of devices; and
controlling operation of the first plurality of devices by the first controller using the first data array, the controlling by the first controller including controlling based on the topology to isolate one or more faults in the first network sector and dynamically restoring power based on requesting and receiving power availability information and circuit capacity restrictions from a second substation controller, wherein the requesting and receiving power availability information and circuit capacity restrictions is performed according to a priority list with a priority setting for each substation controller and wherein isolating the one or more faults includes opening one or more last active nodes before the one or more faults and opening all remaining active nodes immediately following the one or more faults, wherein isolating the one or more fault further includes opening one or more selected phases of one or more of a plurality of switches surrounding the faulted segment, communicating with the second substation controller comprises requesting restoration of power to one or more isolated phases in the one or more isolated segments, and the one or more selected phases and the one or more isolated phases correspond to the one or more faulted phases, and wherein communicating with the second controller further comprises receiving power restoration capability from the second substation controller.

18. The method of claim 17, wherein the network further comprises a second network sector that includes a second plurality of devices distributed along a second feeder connected to a second power source and controlled by the second controller, and the method further comprises:
receiving data directly from each of the second plurality of devices at the second controller and generating a second set of data representing properties of each of the second plurality of devices;
converting, at the second controller, the second set of data into a second data array including a second plurality of array elements, each of the second plurality of array elements representing properties of one of the second plurality of devices, each of the second plurality of elements described in identical code relative to the first plurality of array elements; and
storing the first data array for the first network sector and storing the second data array for a second sector.

19. The method of claim 18, wherein the first and second data arrays include indications of at least: a status of each of the first and second plurality of devices and a configuration of each of the first and second plurality of devices, and the method further comprises storing status data and configuration data for each of the first plurality of devices in the first data array, and storing status data and configuration data for each of the second plurality of devices in the second data array.

20. The method of claim 19, wherein the configuration data is selected from at least one of: previous devices, next devices, branch information, a device type, a priority indication, three-phase protection, and a maximum load capacity.

* * * * *